(12) United States Patent
Ikai

(10) Patent No.: US 6,996,592 B2
(45) Date of Patent: Feb. 7, 2006

(54) DISCRETIZATION PROCESSING METHOD OF TRANSFER FUNCTION IN CONTINUOUS TIME SYSTEMS, SYSTEM AND PROGRAM THEREFOR, AND COMPENSATOR AND FEEDBACK CONTROL SYSTEM USING THE SAME

(75) Inventor: Yoshiaki Ikai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 604 days.

(21) Appl. No.: 10/106,557

(22) Filed: Mar. 26, 2002

(65) Prior Publication Data

US 2003/0060905 A1    Mar. 27, 2003

(30) Foreign Application Priority Data

Sep. 13, 2001  (JP)  ............................. 2001-277595

(51) Int. Cl.
*G06F 17/10* (2006.01)
(52) U.S. Cl. ...................................... 708/300
(58) Field of Classification Search ............ 708/3, 708/300, 819
See application file for complete search history.

(56) References Cited

U.S. PATENT DOCUMENTS

| | | | | |
|---|---|---|---|---|
| 6,281,650 B1 * | 8/2001 | Yutkowitz | .................... | 318/561 |
| 6,721,375 B1 * | 4/2004 | Hammel | ...................... | 375/350 |
| 2002/0156541 A1 * | 10/2002 | Yutkowitz | .................... | 700/28 |

FOREIGN PATENT DOCUMENTS

| | | |
|---|---|---|
| JP | 5-197775 | 8/1993 |
| JP | 5-210419 | 8/1993 |
| JP | 9-081204 | 3/1997 |

* cited by examiner

*Primary Examiner*—Tan V. Mai
(74) *Attorney, Agent, or Firm*—Greer, Burns & Crain, Ltd.

(57) ABSTRACT

A discretization processing method for transforming a transfer function in continuous time systems to a transfer function in discrete time systems is disclosed. To obtain the new transfer function, angular frequency ωa of the original transfer function in continuous time systems is transformed to angular frequency ωc using the bilinear z-transform of the inverse characteristic. In the discretion processing result, the equivalent characteristics of the original transfer function in continuous time systems can be obtained by performing the bilinear z-transform against the new transfer function in continuous time systems having been obtained by the angular frequency transformation of inverse characteristic.

15 Claims, 22 Drawing Sheets

FIG. 4

FREQUENCY RESPONSE DATA
(AFTER PRE-WARP)

| FREQUENCY [kHz] | GAIN [dB] | PHASE [deg.] |
|---|---|---|
| 1.001 | 0.163 | 7.904 |
| 1.008 | 0.165 | 7.953 |
| 1.014 | 0.167 | 8.002 |
| 1.021 | 0.169 | 8.051 |
| .. | .. | .. |
| 261.7 | -5.105 | 121.2 |
| 311.6 | -3.919 | 119.9 |
| 385.6 | -2.878 | 118.6 |
| 506.4 | -1.952 | 117.3 |

FREQUENCY RESPONSE DATA
(BEFORE PRE-WARP)

| FREQUENCY [kHz] | GAIN [dB] | PHASE [deg.] |
|---|---|---|
| 1.000 | 0.163 | 7.904 |
| 1.006 | 0.165 | 7.953 |
| 1.013 | 0.167 | 8.002 |
| 1.019 | 0.169 | 8.051 |
| .. | .. | .. |
| 24.03 | -5.105 | 121.2 |
| 24.19 | -3.919 | 119.9 |
| 24.31 | -2.878 | 118.6 |
| 24.50 | -1.952 | 117.3 |

FIG. 5A

| POLES | ZERO-POINTS |
|---|---|
| f1=30kHz | f1=5.0kHz |
| f2=23kHz $\zeta 2$=0.3 | f2=23kHz $\zeta 2$=0.0 |

FIG. 5B

| POLES | ZERO-POINTS |
|---|---|
| f1=112kHz | f1=5.16kHz |
| f2=25.3kHz $\zeta 2$=0.94 | f2=123kHz $\zeta 2$=0.064 |

FIG. 5C

| POLES | ZERO-POINTS |
|---|---|
| f1=0.750 | f1=−0.511 |
| f2=0.285 $\zeta 2$=0.822 | f2=0.984 $\zeta 2$=0.967 |

FREQUENCY [Hz]

FIG. 8

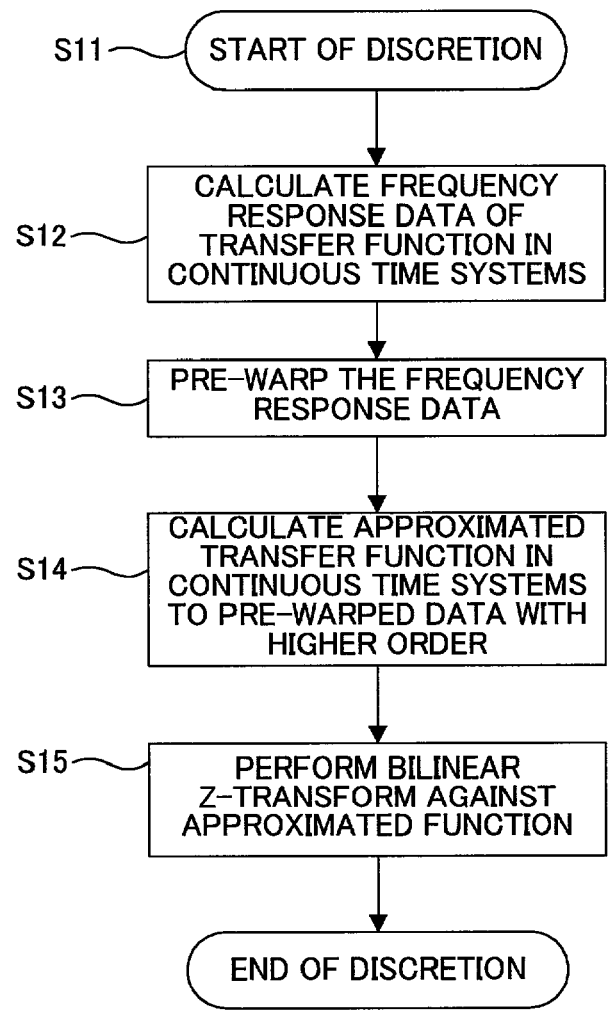

```
         S11 ──( START OF DISCRETION )
                      │
                      ▼
         S12 ──┌──────────────────────┐
               │ CALCULATE FREQUENCY  │
               │ RESPONSE DATA OF     │
               │ TRANSFER FUNCTION IN │
               │ CONTINUOUS TIME SYSTEMS │
               └──────────────────────┘
                      │
                      ▼
         S13 ──┌──────────────────────┐
               │ PRE-WARP THE FREQUENCY │
               │ RESPONSE DATA        │
               └──────────────────────┘
                      │
                      ▼
         S14 ──┌──────────────────────┐
               │ CALCULATE APPROXIMATED │
               │ TRANSFER FUNCTION IN │
               │ CONTINUOUS TIME SYSTEMS │
               │ TO PRE-WARPED DATA WITH │
               │ HIGHER ORDER         │
               └──────────────────────┘
                      │
                      ▼
         S15 ──┌──────────────────────┐
               │ PERFORM BILINEAR     │
               │ Z-TRANSFORM AGAINST  │
               │ APPROXIMATED FUNCTION│
               └──────────────────────┘
                      │
                      ▼
               ( END OF DISCRETION )
```

FIG. 9

| POLE | ZERO-POINT |
|---|---|
| f1=0.159 | f1=−0.524 |
| f2=0.362 | f2=0.659 |
| f3=0.433 | f3=0.942 |
| f4=0.856 | f4=0.995<br>ζ4=0.970 |
| f5=0.933 | -- |

FREQUENCY [kHz]

FREQUENCY [Hz]

FREQUENCY [Hz]

FREQUENCY [Hz]

FIG. 21A

| POLE | ZERO-POINT |
|---|---|
| f1=36.8kHz<br>$\zeta$1=0.866 | f1=36.8kHz<br>$\zeta$1=0.866 |
| f2=26.5kHz<br>$\zeta$2=0.030 | f2=22.0kHz<br>$\zeta$2=0.110 |
| f3=22.5kHz<br>$\zeta$3=0.025 | f3=22.0kHz<br>$\zeta$3=0.161 |
| f4=19.0kHz<br>$\zeta$4=0.030 | f4=16.9kHz |
| f5=1Hz | f5=16.1kHz |
| f6=1Hz | f6=159kHz |
| -- | f7=159kHz |

FIG. 21B

| POLE | ZERO-POINT |
|---|---|
| f1=158kHz | f1=951kHz |
| f2=86.3kHz | f2=165kHz |
| f3=0.320Hz | f3=4.85kHz |
| f4=10.2kHz<br>$\zeta$4=0.925 | f4=775Hz |
| f5=20.2kHz<br>$\zeta$5=0.489 | f5=512Hz |
| f6=25.9kHz<br>$\zeta$6=0.326 | f6=24.3kHz<br>$\zeta$6=0.000107 |
| f7=34.8kHz<br>$\zeta$7=0.418 | f7=30.6kHz<br>$\zeta$7=0.0032 |
| -- | f8=62.8kHz<br>$\zeta$8=0.125 |

FIG. 21C

| POLE | ZERO-POINT |
|---|---|
| f1=-1.00 | f1=0.954 |
| f2=0.753 | f2=0.762 |
| f3=0.589 | f3=-0.955 |
| f4=-0.422<br>$\zeta$4=0.915 | f4=-0.933 |
| f5=-0.588<br>$\zeta$5=0.113 | f5=-0.642 |
| f6=0.670<br>$\zeta$6=0.451 | f6=0.924<br>$\zeta$6=0.779 |
| f7=0.716<br>$\zeta$7=0.159 | f7=0.997<br>$\zeta$7=0.308 |
| -- | f8=0.9999<br>$\zeta$8=0.0872 |

FREQUENCY [Hz]

DISCRETIZATION PROCESSING METHOD OF TRANSFER FUNCTION IN CONTINUOUS TIME SYSTEMS, SYSTEM AND PROGRAM THEREFOR, AND COMPENSATOR AND FEEDBACK CONTROL SYSTEM USING THE SAME

BACKGROUND OF THE INVENTION

1. Field of the Invention

The present invention relates to a discretization processing method for transforming a transfer function in continuous time systems to a transfer function in discrete time systems, a system and a program therefor, and a compensator and a feedback control system using the same. More particularly, the present invention relates to a discretization processing method appropriate for discretizing a transfer function in continuous time systems in which poles and zero points of the transfer function in continuous time systems locate at a frequency near the Nyquist frequency or higher than the Nyquist frequency, a system and a program therefor, and a compensator and a feedback control system using the same.

BACKGROUND OF THE INVENTION

As digital equipment becomes popularly used in recent years, analog signal processing is being substituted by digital signal processing. The analog signal processing is performed in continuous time systems, while the digital signal processing is performed in discrete time systems. Therefore, in order to process an analog signal in continuous time systems by means of digital signal processing, there is required a transformation from continuous time systems to discrete time systems.

In general, an object system is expressed by a transfer function defined by a mathematical model. For example, when designing a digital filter or a digital controller for controlling an object, it is necessary to transform the transfer function of an object system that is inherently categorized in continuous time systems to a transfer function in discrete time systems.

In such a so-called discretization method for transforming a transfer function in continuous time systems into a transfer function in discrete time systems, there is a known method called s-z transform. This method has widely been introduced in publications, one of which is "A point of Digital Signal Processing" by Ishida, Yoshihisa et Kamata, Hiroyuki, Sangyo Tosho Publishing Co., Ltd. Basically the s-z transform is a method for transforming the s-plane to the z-plane. In the s-plane, vertical axis is a frequency axis of $j\omega$ of which range is $\pm\infty$ (infinite), while, in the z-plane, a unit circle having a radius of 1 corresponds to a frequency axis, having a finite range.

Accordingly, in the s-z transform, it is necessary to transform a frequency of an infinite interval to a frequency of a finite interval. However, in order to correspond each other one by one, there exist some restrictions. Therefore it is difficult to discretize so as to coincide frequency characteristic, impulse response, step response, etc. completely.

For example, there has been a standard z-transform method in which a transfer function of analog continuous time systems is transformed to a transfer function in discrete time systems with coincident step response. For this reason the method is referred to as the step response invariant method (or impulse response invariant method). In this standard z-transform, as shown in FIG. 22, when the frequency range of the infinite interval in the s-region is matched to a frequency range of the finite interval in the z-region, the frequency axis transformed to the z-region is repeated at certain periods when being extended to the infinite frequency region again. The repetition cycle equals to the Nyquist frequency fn specified by the sampling theorem, which is equal to a half of a sampling frequency fs.

When this folding is made, as shown in FIG. 22, an overlap distortion (or an alias distortion) is produced by the occurrence of the overlap in the amplitude characteristic, causing that the amplitude characteristic in analog continuous time systems cannot be maintained. For this reason, as shown in FIG. 22, the application of this standard z-transform is restricted to a filter that is limited frequency range against a high frequency region.

For example, as illustrated in a frequency characteristic diagram according to the standard z-transform method shown in FIG. 24, in case of transforming a transfer function in continuous time systems in which the amplitude is not sufficiently restricted in the region higher than the Nyquist frequency fn (25 kHz in this example), the characteristics (amplitude and phase) of the discrete time systems transformed by the standard z-transform greatly deviate from the characteristics of continuous time systems in a high frequency region.

In contrast, in the bilinear z-transform, generation of such an alias distortion is prevented. As shown in FIG. 23, the region of infinite length ($\omega a$) in the s-plane is matched to a finite region (p), and then the standard z-transform is carried out against the finite region p. According to this method, an alias distortion is no more produced because the frequency axis having the region of $\pm\infty$ in the s-plane is projected to a unit circle on the z-plane when performing the s-z transform. Here, the relation between the angular frequency $\omega a$ in the s-region and the angular frequency $\omega d$ in the z-region is expressed as follows:

$$\omega d = (2/T) \cdot atan(\omega a \cdot t/2) \qquad (1)$$

where T is a sampling period in discretization and atan is an abbreviation of arctangent. As can be understood, because a trigonometric function $\tan\theta$ can take values between $\pm\infty$ in the region of $-\pi/2 \leq \theta \leq \pi/2$, the alias distortion can be avoided.

Using this bilinear z-transform, accurate discretization can be obtained when poles and zero points of the original transfer function in continuous time systems are located sufficiently lower than the Nyquist frequency fn (a half of the sampling frequency in discrete time systems).

On the other hand, when poles and zero points are located near the Nyquist frequency or higher than the Nyquist frequency, it is often occurred that the characteristics in the high frequency region of the transformed discrete systems deviate greatly from the characteristics in continuous time systems, which causes a problem of such a method.

More specifically, the frequency characteristic diagram according to the bilinear z-transform is shown in FIG. 25. As shown in this figure, when the poles and the zero points of the transfer function in continuous time systems are located near the Nyquist frequency (25 kHz in this example) or higher than the Nyquist frequency, the characteristics (amplitude and phase) in discrete time systems being transformed by the bilinear z-transform (illustrated by the solid lines) greatly deviate from the characteristics in continuous time systems (illustrated by the dotted lines) in a high frequency range. This characteristic deviation in the high frequency range is produced by the transformation in which the characteristics in the high frequency being shifted (which is referred to as 'warping') to a low frequency range by tan θ in the above formula (1).

Further, using the warping in the bilinear z-transform is defined by formula (1), there has been proposed a method that only pole and zero point of the transfer function in continuous time systems before the discretization are shifted (frequency shifting) to replace with new transfer function in continuous time systems (which was disclosed, for example, in the official gazette of Japanese Unexamined Patent Publication No. Hei-5-210419, etc.) However, according to this method, it is not possible to transform when the poles and zero points of the transfer function in continuous system are located at higher frequency than the Nyquist frequency because tan θ in the above formula (1) becomes greater than π/2, which produces a negative frequency value after the shift. Therefore this frequency shift method cannot be employed and it is still difficult to make the characteristics coincident.

Accordingly, there has been a problem in the prior art that only an inaccurate transfer function having different characteristics is obtained when a transfer function being designed and identified in continuous time systems is intended to discretize to perform digital processing.

In order to construct such a system according to discrete time systems from a system originally designed in continuous time systems, for example, the following methods have been necessary: In case of performing digital control by performing discretion of compensator of a feedback control system having been designed in continuous systems, there has been employed a method of either substituting an analog control circuit without discretization in respect of poles and zero points located near the Nyquist frequency, or raising a sampling frequency so that the Nyquist frequency is shifted to a higher frequency.

Using the above-mentioned measures, it is possible to obtain the characteristics in discrete time systems being approximate to the characteristics in continuous time systems. However, there is a problem that characteristics of analog circuits vary, in contrast to digital circuits, because of production dispersion or aged deterioration in electronic components. Also, analog circuits become costly when it is intended to use in mass-produced control units. When employing another method mentioned above, high-speed processors are required to raise the sampling frequency. This becomes also costly and disadvantageous considering the use of such processors for mass-produced control units.

SUMMARY OF THE INVENTION

Accordingly, it is an object of the present invention to provide a discretization method of a transfer function in continuous time systems for transforming the transfer function in continuous time systems having poles and zero points being located near the Nyquist frequency or higher than the Nyquist frequency to a discretized transfer function having the characteristics being coincident to the characteristics of the original transfer function, a system and a program therefor, and a compensator and a feedback control system using the same.

It is another object of the present invention to provide a discretization method of a transfer function in continuous time systems for realizing the transfer function in continuous time systems having poles and zero points near the Nyquist frequency or higher than the Nyquist frequency by means of a discretized system without using an analog circuit, a system and a program for the method, and a compensator and a feedback control system using the same.

It is still another object of the present invention to provide a discretization method of a transfer function in continuous time systems for realizing the transfer function in continuous time systems having poles and zero points near the Nyquist frequency or higher than the Nyquist frequency by means of a discretized system without raising the sampling frequency, a system and a program for the method, and a compensator and a feedback control system using the same.

In order to attain the above-mentioned object, according to the present invention, there is disclosed a discretization processing method for transforming a transfer function in continuous time systems to a transfer function in discrete time systems. The method includes the steps of; calculating a new transfer function in continuous time systems by transforming an angular frequency of the transfer function in continuous time systems to an angular frequency by using an inverse characteristics of an angular frequency transformation characteristic in a bilinear z-transform; and performing the bilinear z-transform of the angular frequency transformation characteristic against the new transfer function in continuous time systems.

According to the present invention, a discretization processing system includes input equipment and data processing equipment. The data processing equipment transforms angular frequency of the transfer function in continuous time systems to an angular frequency by using an inverse characteristic of angular frequency transformation characteristic in a bilinear z-transform, to calculate a new transfer function in continuous time systems. The data processing equipment also performs the bilinear z-transform of the angular frequency transformation characteristic against the new transfer function in continuous time systems, to obtain the transfer function in discrete time systems.

Further, according to the present invention, a program for performing discretization processing includes a program for transforming angular frequency of the transfer function in continuous time systems to an angular frequency by using an inverse characteristic of angular frequency transformation characteristic in a bilinear z-transform, to calculate a new transfer function in continuous time systems; and a program for performing the bilinear z-transform of the angular frequency transformation characteristic against the new transfer function in continuous time systems.

Still further, according to the present invention, a compensator for discrete processing system includes digital equipment for performing the transfer function in discrete time systems being obtained by performing the bilinear z-transform against a new transfer function in continuous time systems with angular frequency transformation characteristic. Here, the above-mentioned new transfer function is obtained by transforming the angular frequency of the transfer function in continuous time systems to an angular frequency by using an inverse characteristic of angular frequency transformation characteristic in a bilinear z-transform.

Still further, according to the present invention, a feedback control system includes; a status detection equipment for observing the control object status; and a digital equipment for controlling the control object according to the status signal from the status detection equipment, using a transfer function in discrete time systems obtained by performing the bilinear z-transform of angular frequency transformation characteristic against a new transfer function in continuous time systems. Here, the new transfer function is obtained by transforming the angular frequency of the transfer function in continuous time systems, being provided for compensating characteristic of the control object, to an angular frequency by using an inverse characteristic of angular frequency transformation characteristic in a bilinear z-transform.

According to the method of the present invention, using an angular frequency transformation characteristic of the bilinear z-transform being expressed by formula (1), a new transfer function in continuous time systems is generated so as to obtain a characteristic of the discretization result being coincident with that of the original transfer function in continuous time systems. And this new transfer function in continuous time systems is then transformed by means of the bilinear z-transform.

For this purpose, according to the present invention, angular frequency ωa of the original transfer function in continuous time systems is transformed to angular frequency ωc using the inverse characteristic of the bilinear z-transform, to generate a new transfer function in continuous time systems. The inverse characteristic is an inverse transformation characteristic of the transformation characteristic of the bilinear z-transform expressed by formula (1). Therefore, by performing the bilinear z-transform against the transfer function in continuous time systems having been newly obtained by the angular frequency transformation of the inverse characteristic, it is possible to obtain a discretization result having the coincident characteristic with that of the original transfer function in continuous time systems.

In such a compensator and a feedback control system performing the discretization result of which characteristics are coincident, it is not necessary to employ an analog circuit for bringing to the characteristic of continuous time system nor a high speed processor for producing high sampling frequency rate, which contributes to reduce the cost of a compensator or a feedback control system.

According to the present invention, preferably the above-mentioned calculation step includes the steps of; calculating frequency response data of the transfer function in continuous time systems; shifting the frequency ωa of the frequency response data to the frequency ωc using the formula ωc=2/ T·tan(ωa·T/2); and calculating a new transfer function in continuous time systems being approximated to the frequency response data after the frequency shifting.

In this embodiment of the present invention, in order to obtain the discretization result coincident with the original transfer function in continuous time systems, a pre-warp processing is performed against the entire frequency response of the transfer function in continuous time systems. By generating the new transfer function in continuous time systems based on the above-mentioned pre-warp processing, the discrete result having characteristic provided in the original transfer function in continuous time systems can be obtained by the use of conventional bilinear z-transform.

Further, according to the present invention, preferably the calculation step of the new transfer function in continuous time systems includes the step of approximating to a transfer function having higher degree than the number of degrees of the original transfer function in continuous time systems. This enables to make the discretization result coincide more accurately with the characteristic of the original transfer function in continuous time systems.

Still further, according to the present invention, preferably the calculation step of the new transfer function in continuous time systems includes the step of approximating to a transfer function having lower degree than the number of degrees of the original transfer function in continuous time systems. This enables to realize the original transfer function in continuous time systems with the discretization result obtained by less processing amount.

Still further, according to the present invention, preferably the calculation step of the new transfer function in continuous time systems includes the step of approximating to a transfer function from the shifted frequency response data by means of the least square method. This produces the approximation easier.

Accordingly, particularly when performing digital control by discretizing a compensator in the feedback control systems, it is no more necessary to employ a method of substituting an analog control circuit to cope with poles and zero points near the Nyquist frequency, nor to use a high speed processor to increase the sampling frequency. Thus the product manufacturing cost can be reduced.

In addition, when it is difficult to coincide the approximation, the original characteristics can be reproduced accurately by increasing the number of degrees at the time of approximation. On the other hand, by reducing the number of degrees at the time of approximation, it becomes possible to reduce the processor load.

Further scopes and features of the present invention will become more apparent by the following description of the embodiments with the accompanied drawings.

BRIEF DESCRIPTION OF THE DRAWINGS

FIG. 4 shows an operation explanation diagram of a pre-warp processing shown in FIG. 1.

FIGS. 5A, 5B and 5C show explanation diagrams of an example of poles and zero points shown in FIG. 1.

FIG. 8 shows a flowchart of the discretization processing according to a second embodiment of the present invention.

FIG. 9 shows an explanation diagram of poles and zero points as a result of the discretization processing according to the second embodiment of the present invention shown in FIG. 8.

FIGS. 21A, 21B and 21C show explanation diagrams of pole data and zero point data of the compensator in discrete time systems shown in FIG. 18.

DETAILED DESCRIPTION OF THE PREFERRED EMBODIMENTS

The preferred embodiment of the present invention is described hereinafter referring to the charts and drawings in order of a first embodiment, a second embodiment, a third embodiment, an application to feedback control systems and a compensator, and other embodiment.

[First Embodiment]

Figure 1:
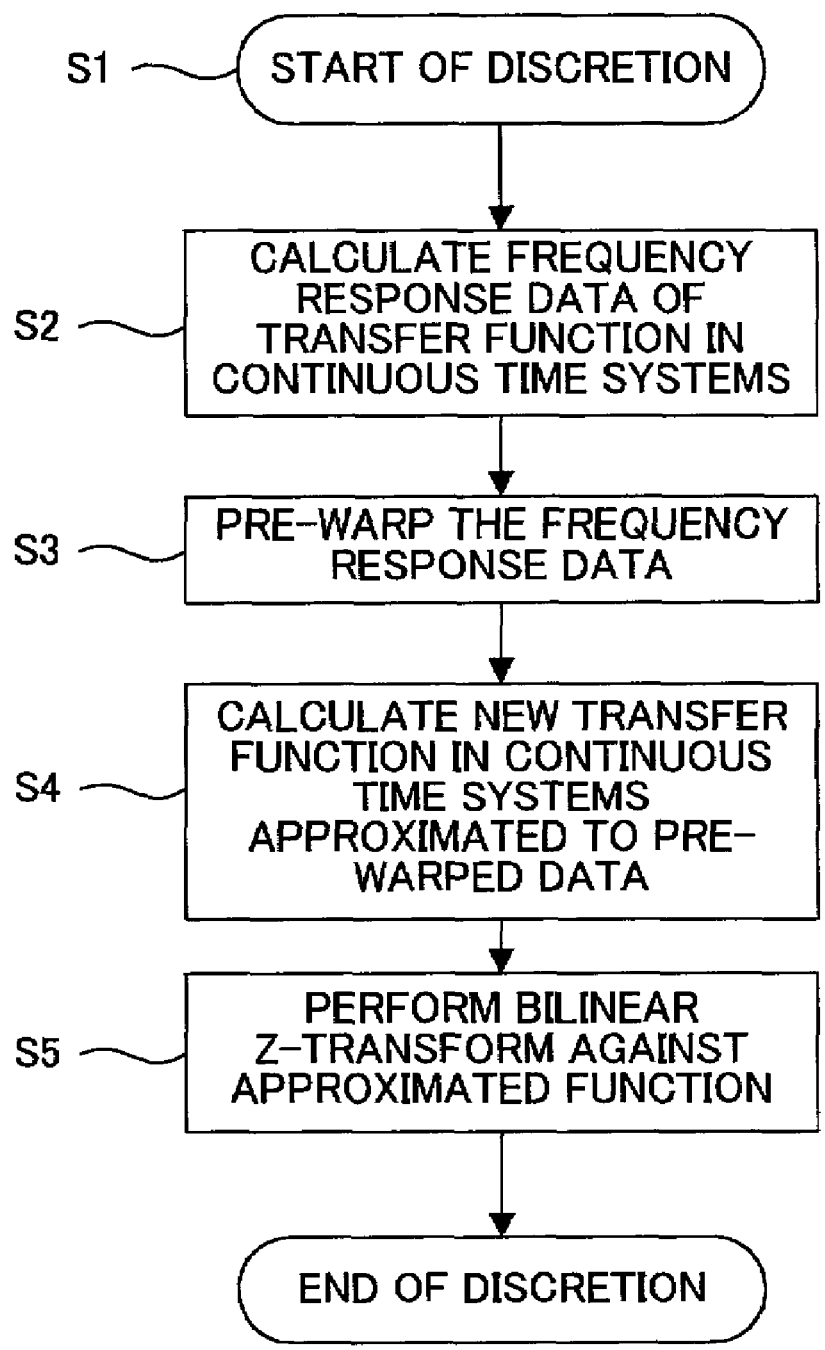
FIG. 1 shows a flowchart of the discretization processing according to a first embodiment of the present invention.
Figure 2A:
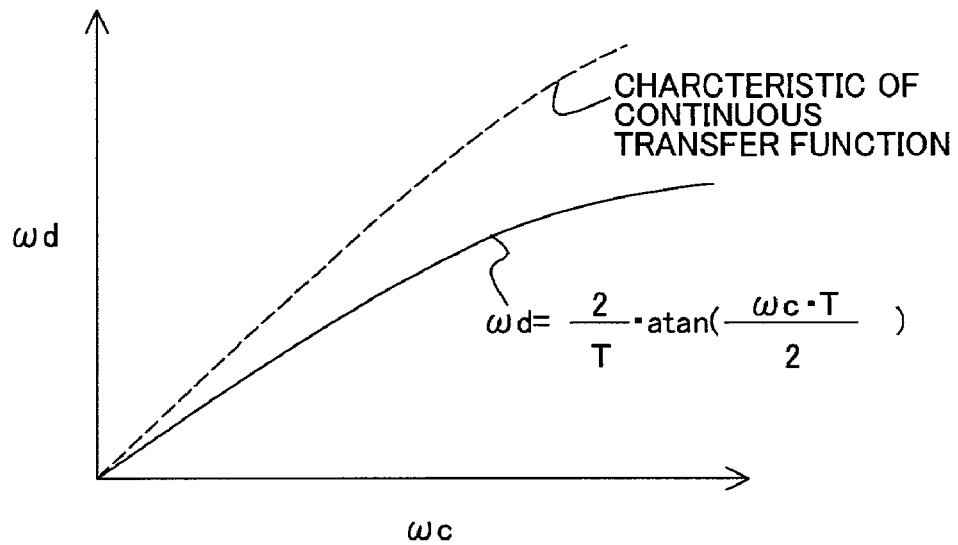
FIGS. 2A and 2B show explanation diagrams of the principle of the discretization processing according to the present invention.
Figure 2B:
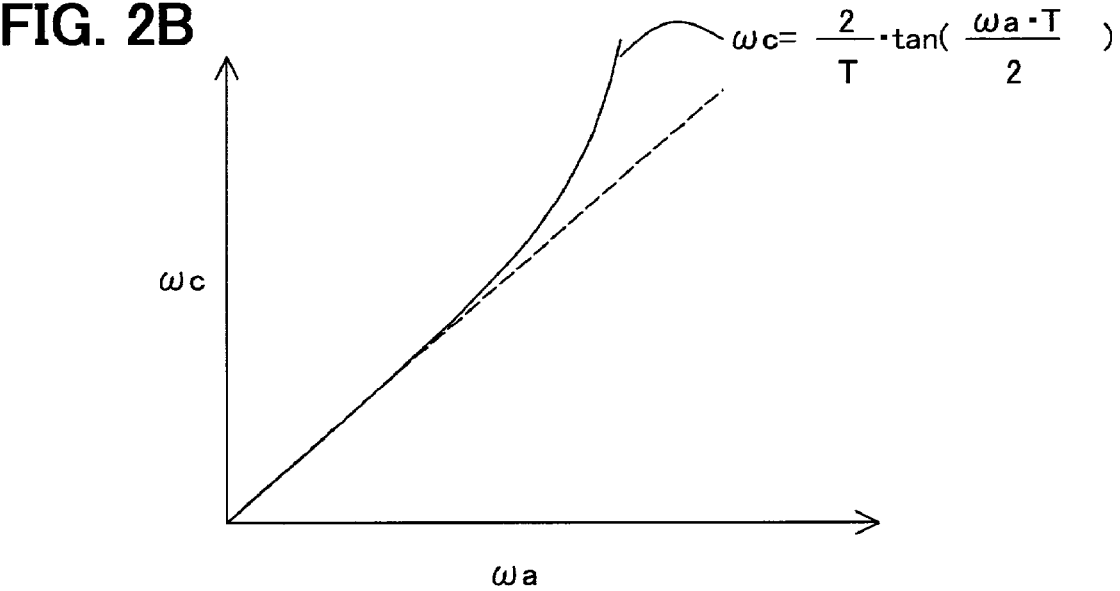
Figure 3:
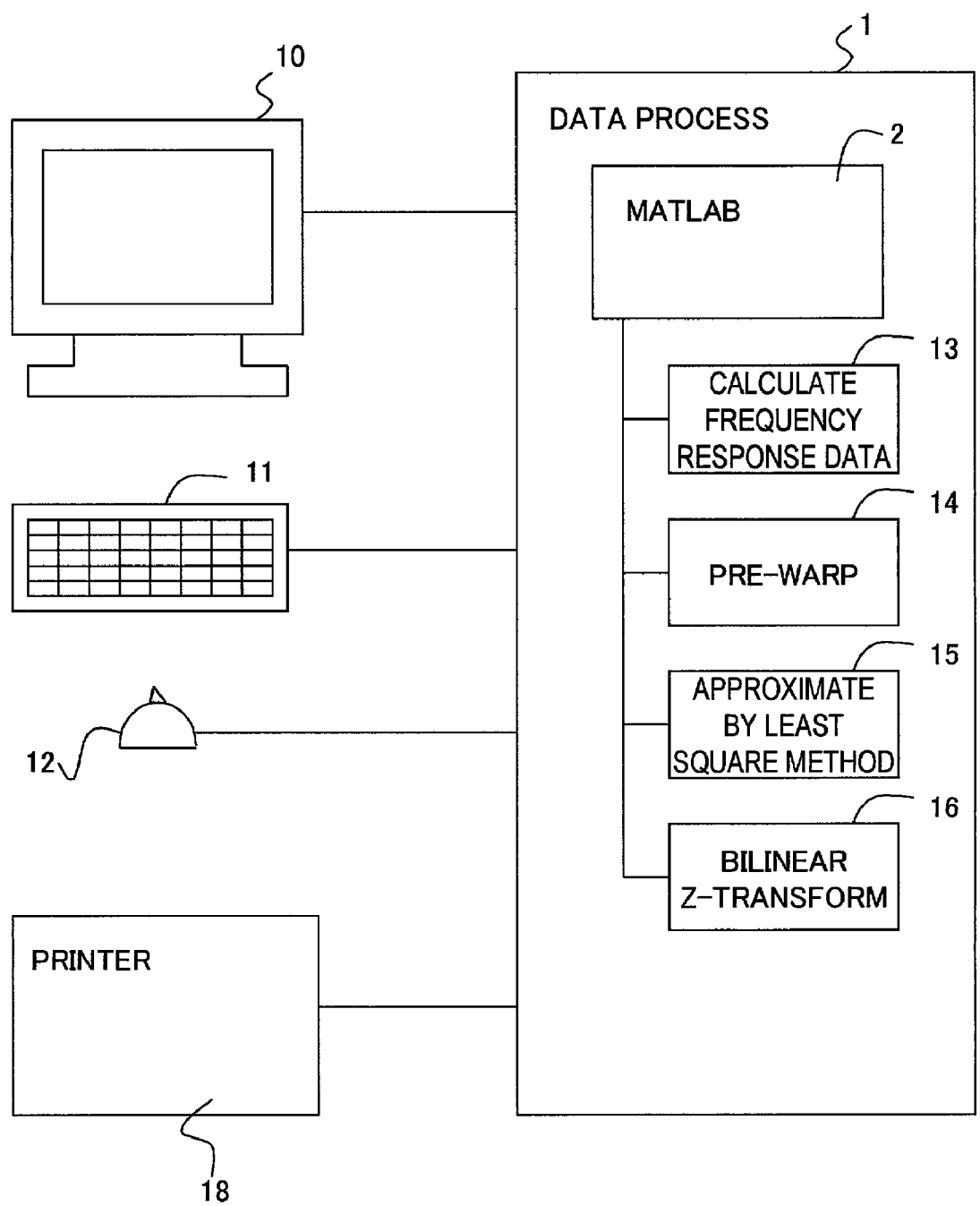
FIG. 3 shows a block diagram of an embodiment of the discretization processing according to the present invention.
Figure 6:
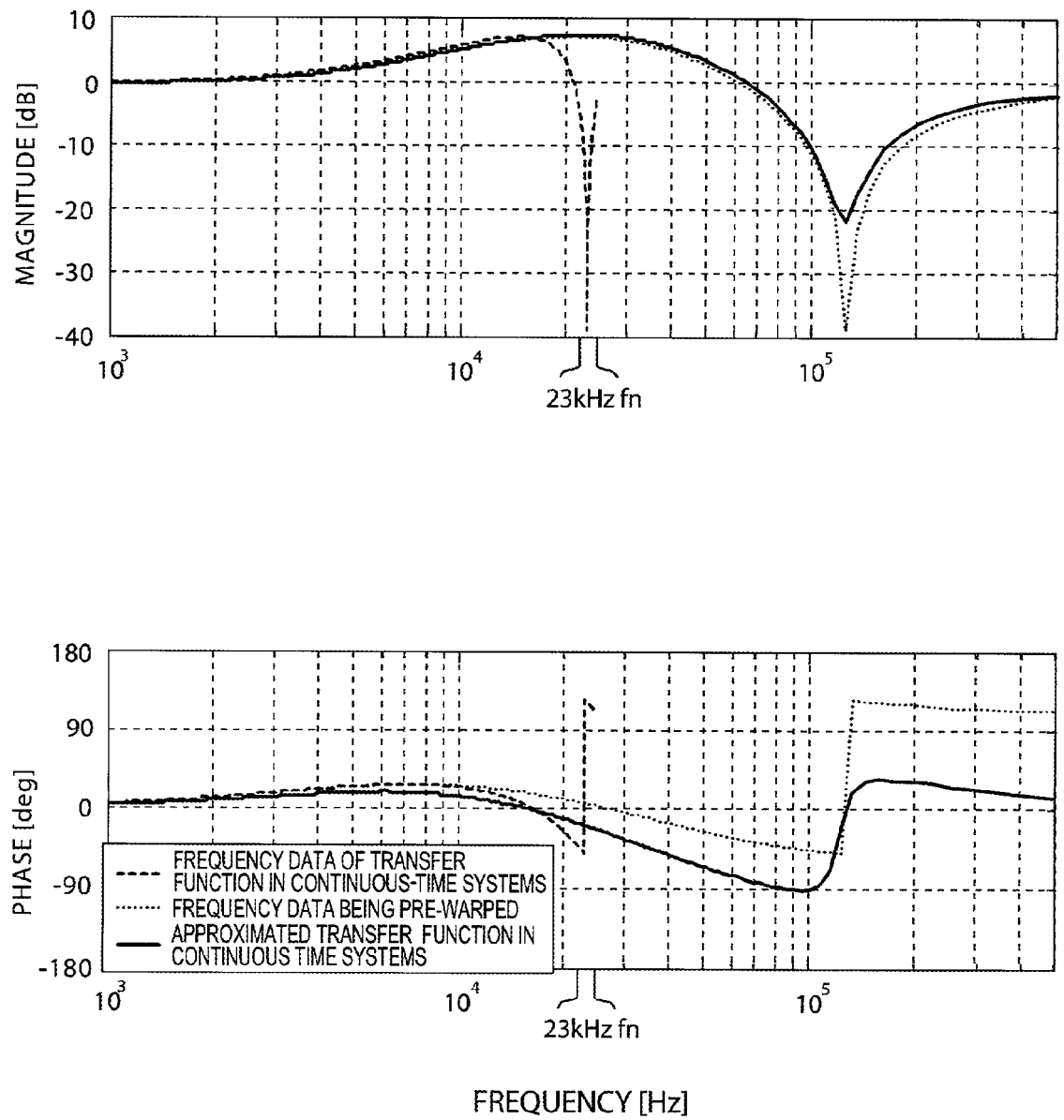
FIG. 6 shows a frequency characteristic diagram being pre-warped by the processing shown in FIG. 4.
Figure 7:
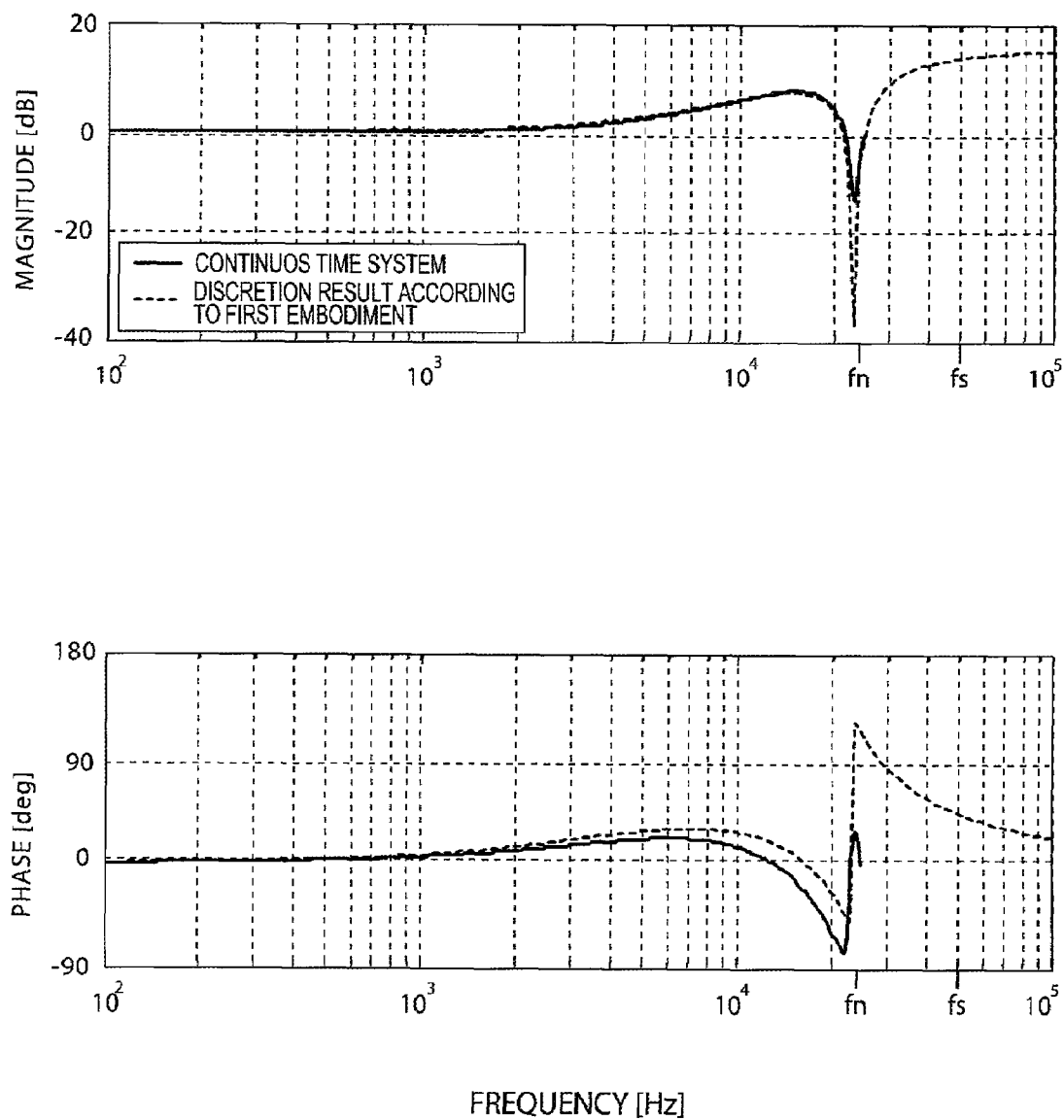
FIG. 7 shows a frequency characteristic diagram as a result of discretization according to the embodiment shown in FIG. 1.

FIG. 1 shows a flowchart of the discretization processing according to a first embodiment of the present invention. FIGS. 2A and 2B show explanation diagrams of the principle of the discretization processing according to the present invention. FIG. 3 shows a block diagram of the discretization processing according to the method shown in FIG. 1. FIG. 4 shows an explanation diagram of a pre-warp processing shown in FIG. 1. FIGS. 5A, 5B and 5C show explanation diagrams of poles and zero points in the embodiment shown in FIG. 1. FIG. 6 shows an explanation diagram of the generation operation of a pre-warping and approximation function in the embodiment shown in FIGS. 5A to 5C. Further, FIG. 7 shows frequency characteristic diagrams of a transfer function in continuous time systems before transformation and a transfer function in discrete time systems after transformation according to the embodiment shown in FIG. 5.

First, referring to FIGS. 5A to 5C and 6, a transfer function in continuous time systems is explained. The transfer function in continuous time systems is defined by poles and zero points in a transfer function as shown in FIGS. 5A to 5C. For example, a transfer function in continuous time systems having two poles and two zero points shown in FIG. 5A is expressed by the following formula (4).

$$\frac{K_1 \cdot (s + W_{n11}) \cdot (s^2 + W_{n12}^2)}{(s + W_{d11}) \cdot (s^2 + 2 \cdot Z_{d12} \cdot W_{d12} \cdot s + W_{d12}^2)} \quad (4)$$

The transfer function having the values of poles and zero points shown in FIG. 5A denotes a first-order phase lead compensator for 5 kHz to 30 kHz, and a notch filter for 23 kHz and $\zeta=0.3$. In formula (4), two zero points are expressed by angular frequencies Wn11, Wn12, and two poles are expressed by angular frequencies Wd11, Wd12. Also, K1 is a gain and Zd12 is the above-mentioned $\zeta$.

Accordingly, by applying the figures of poles and zero points shown in FIG. 5A to formula (4), the following values are obtained: K1=6.00, Wn11=3.14e3 rad/s, Wn12=1.45e5 rad/s, Wd11=1.89e5 rad/s, Wd12=1.45e5 rad/, and Zd12=0.30. Frequency characteristics of this transfer function are shown by the broken lines in FIG. 6, in which characteristics of frequency vs. amplitude and frequency vs. phase are shown respectively. Here, if a sampling frequency T is set to 50 kHz, the Nyquist frequency fn becomes 25 kHz. Therefore, this transfer function has poles and zero points being located very close to the Nyquist frequency.

Now, referring to FIG. 1, a discretization processing is explained hereinafter.

(S1) First, coefficients in formula (4) of a transfer function in continuous time systems (i.e. the values of poles, zero points, and gain) are input to start the discretization processing.

(S2) Next, frequency response of the input transfer function in continuous time systems is calculated. The frequency response data can be obtained from the transfer function using CAD (Computer Assisted Design) software such as MATLAB (brand name of the product manufactured by MathWorks, Inc). In this example, the characteristics (amplitude and phase) from 1 kHz to 24.5 kHz are calculated for 500 data points. The calculated response data are shown in FIG. 4, of which chart is illustrated by the broken lines in FIG. 6.

(S3) This frequency response data is then pre-warped (frequency-shifted). The pre-warping is performed by transforming only frequencies according to the following formula (5) without altering the values of gains and phases in the data.

$$\omega c = (2/T) \cdot \tan(\omega a \cdot T/2) \quad (5)$$

where $\omega c$ denotes an angular frequency after pre-warping, and $\omega a$ denotes an angular frequency before pre-warping, and T denotes a sampling period of the discretization. Namely, as shown in FIG. 2B, frequency $\omega a$ of the transfer function in continuous time systems is pre-warped to transform to frequency $\omega c$.

The pre-warped frequency response data is shown in FIG. 4 as well as the frequency characteristic thereof is shown by the dotted line in FIG. 6. According to the conventional frequency shift method, poles and zero points themselves are shifted. Therefore the Nyquist frequency point (25 kHz in this case) is shifted to $+\infty$ Hz and the frequency shift is not possible in the region higher than the Nyquist frequency. Accordingly, when a pole exists at 30 kHz as in case of this transfer function, it was not possible in the conventional method to shift the pole frequency. In contrast, according to the present invention, in place of poles and zero points, frequency response data in the transfer function are pre-warped. Therefore, the pre-warped frequency response data has no relation to the location of poles and zero points.

(S4) A new transfer function in continuous time systems is obtained by approximating from this frequency response data. For this approximation, least square approximation is employed in this example. The calculation of least square approximation is also performed using the aforementioned MATLAB. The usage of MATLAB for calculation of least square approximation is described in detain in publications such as "MATLAB numeric analysis" Borse, G. J., pp. 357–380, published by Ohmsha, Ltd. There are shown the approximated frequency response of the new transfer function in continuous time systems by the solid line in FIG. 6, and the poles and zero points in FIG. 5B. Further, the approximated transfer function formula is expressed by the following formula (6).

$$\frac{K_2 \cdot (s + W_{n21}) \cdot (s^2 + W_{n22}^2)}{(s + W_{d21}) \cdot (s^2 + 2 \cdot Z_{d22} \cdot W_{d22} \cdot s + W_{d22}^2)} \quad (6)$$

where, K2=0.888, Wn21=3.24e4 rad/s, Wn22=7.72e5 rad/s, Zn22=0.0639, wd21=7.01e5 rad/s, Wd22=1.59e5 rad/s, and Zd22=0.943.

(S5) Finally, the approximated transfer function in continuous time systems is discretized by the aforementioned bilinear z-transform. The details of this bilinear z-transform are described in various publications of control engineering, one of which is "Dejitaru shingou shori no pointo" (tentative translation: "Points on digital signal processing") Ishida, Yoshihisa et Kamata, Hiroyuki, pp. 136–151, Sangyo Tosho Publishing Co., Ltd. For example, the following s-z transform formula is used.

$$s=(2/T)\cdot(1-Z^{-1})/(1+Z^{-1})$$

The frequency response that is results of the discretion are illustrated by the solid line in FIG. 7. In FIG. 7, the dotted lines denote the frequency response of the original transfer function in continuous time systems expressed by the aforementioned formula (5). The transfer function after the discretization is expressed by the following formula (7), and the poles and zero points thereof are shown in FIG. 5C.

$$\frac{K_3 \cdot (z + W_{n31}) \cdot (z^2 + 2 \cdot Z_{n32} \cdot W_{n32} \cdot z + W_{n32}^2)}{(z + W_{d31}) \cdot (z^2 + 2 \cdot Z_{d32} \cdot W_{d32} \cdot z + W_{d32}^2)} \quad (7)$$

where, K3=1.386, Wn31=−0.5105, Wn32=0.9839, Zn32=0.9671, Wd31=0.7502, Wd32=0.2851, and zd32=0.8217.

The method according to the present invention is summarized below: The angular frequency transformation characteristic of the bilinear z-transform is expressed by formula (1), as shown in FIG. 2A. A new transfer function in continuous time systems is generated from the original transfer function in continuous time systems so as to obtain the discretization result coincident with the characteristic of the original transfer function in continuous time systems. The obtained new transfer function in continuous time systems is transformed using the bilinear z-transform.

For this purpose, according to the present invention, the angular frequency ωa is transformed to angular frequency ωc to generate the new transfer function in continuous time systems, as shown in FIG. 2B. As shown in FIGS. 2A and 2B, the formula (5) applied in FIG. 2B is an inverse transformation characteristic of the transformation characteristic of formula (1) applied in FIG. 2A. Accordingly, by transforming using the bilinear z-transform the new transfer function in continuous time systems having been transformed through angular frequency transformation, there can be obtained the discretization result having the characteristic of the original transfer function in continuous time systems illustrated by the dotted line in FIG. 2A.

As mentioned above, in order to obtain the discretization result coincident with the original transfer function in continuous time systems, the pre-warp processing such as shown in formula (5) is performed against the entire frequency response of the transfer function in continuous time systems. Based on this processing, the new transfer function in continuous time systems is generated. Thus the discretization result having characteristic provided in the original transfer function in continuous time systems can be obtained by the use of conventional bilinear z-transform.

Figure 24:
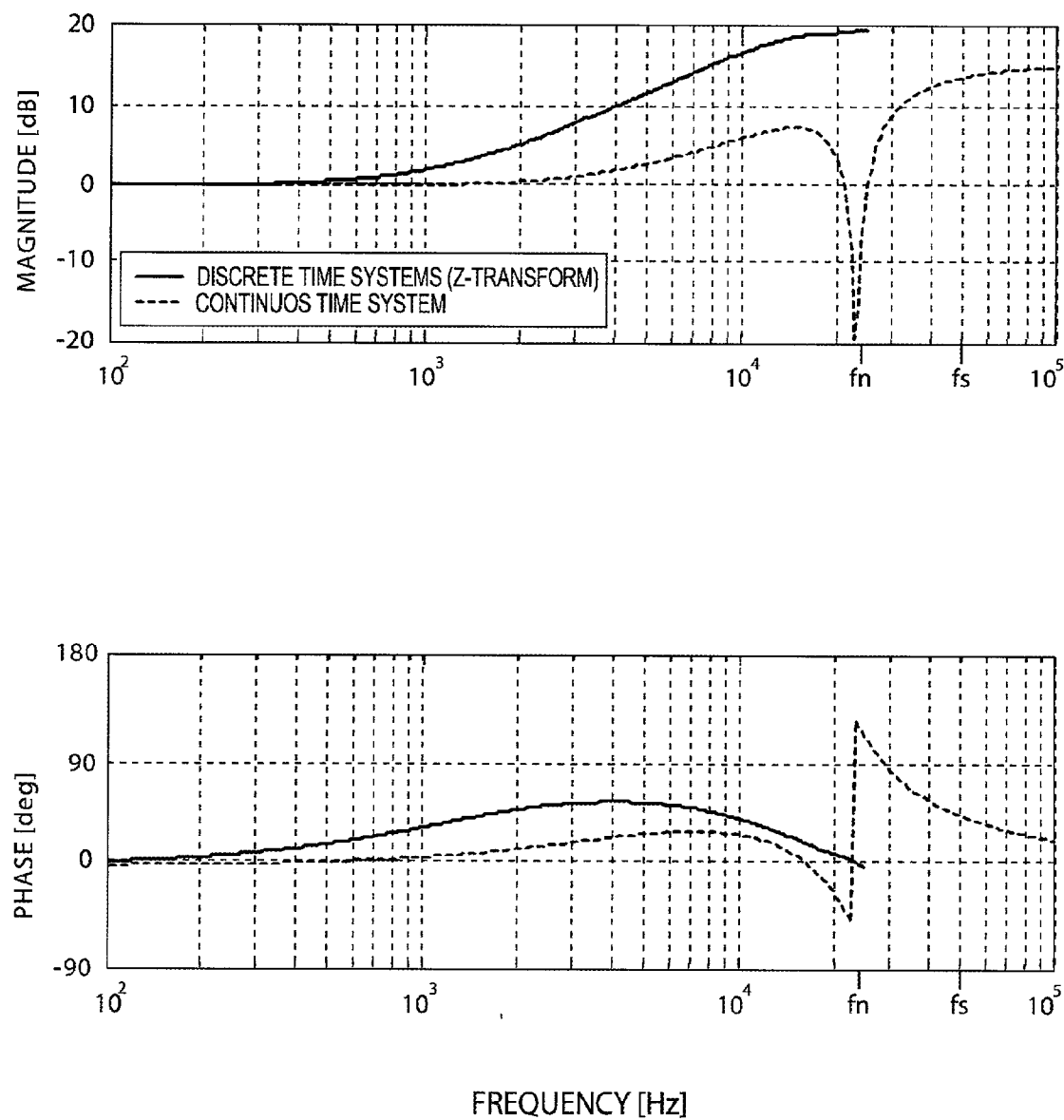
FIG. 24 shows a frequency characteristic diagram of the conventional s-z transform.
Figure 25:
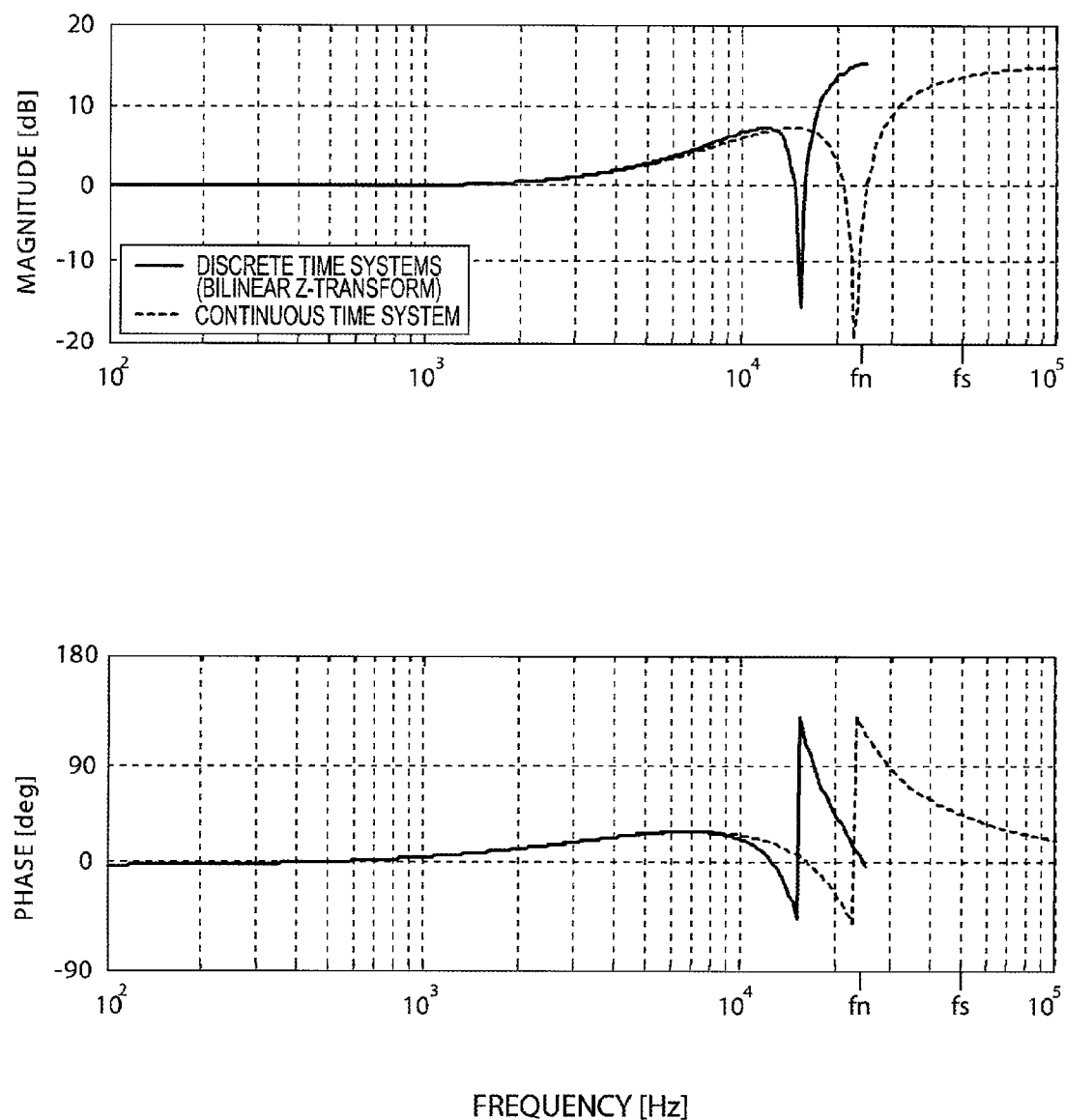
FIG. 25 shows a frequency characteristic diagram of the conventional bilinear z-transform.

FIG. 24 in the earlier part of this description has shown an example of the z-transform for discretizing the transfer function in continuous time systems being identical to the transfer function in the first embodiment. Also, FIG. 25 having been referred to before is an example of bilinear transformation for discretizing the transfer function. As compared to the results shown in FIGS. 24, 25, the discretization result according to the present invention illustrated by the solid line in FIG. 7 indicates the characteristic quite coincident with the transfer function in continuous time systems.

Thus, there can be obtained the transfer function in discrete time systems having a characteristic of fidelity with the transfer function in continuous time systems even in case the poles and zero points are located at frequencies higher than the Nyquist frequency. Accordingly, the method according to the present invention enables digital processing correctly even though performing discretion of a transfer function after the transfer function is designed and identified by the continuous time systems in which handling is relatively easy.

In FIG. 3, there is shown a system configuration for performing this discretization processing. As shown in FIG. 3, the system is constituted of a data processing unit 1, a display 10, input devices (keyboard 11 and mouse 12) and an output device (printer) 18. The data processing unit 1 is configured of a CPU, a memory, etc. Here, programs 13–16 constituted by the aforementioned MATLAB 2 are installed to perform the discretization processing. More specifically, there are the program 13 for calculating frequency response data in the aforementioned step S2, the program 14 for generating pre-warping data in step S3, the program 15 for performing the least square approximation in step S4, and the program 16 for performing the bilinear z-transform in step S5.

In this system, a gain, poles and zero points (FIG. 5A) of a transfer function in continuous time systems are input from the input devices 11, 12, and discretion results having a coincident the characteristic is output (FIG. 5C).

[Second Embodiment]

Figure 10:
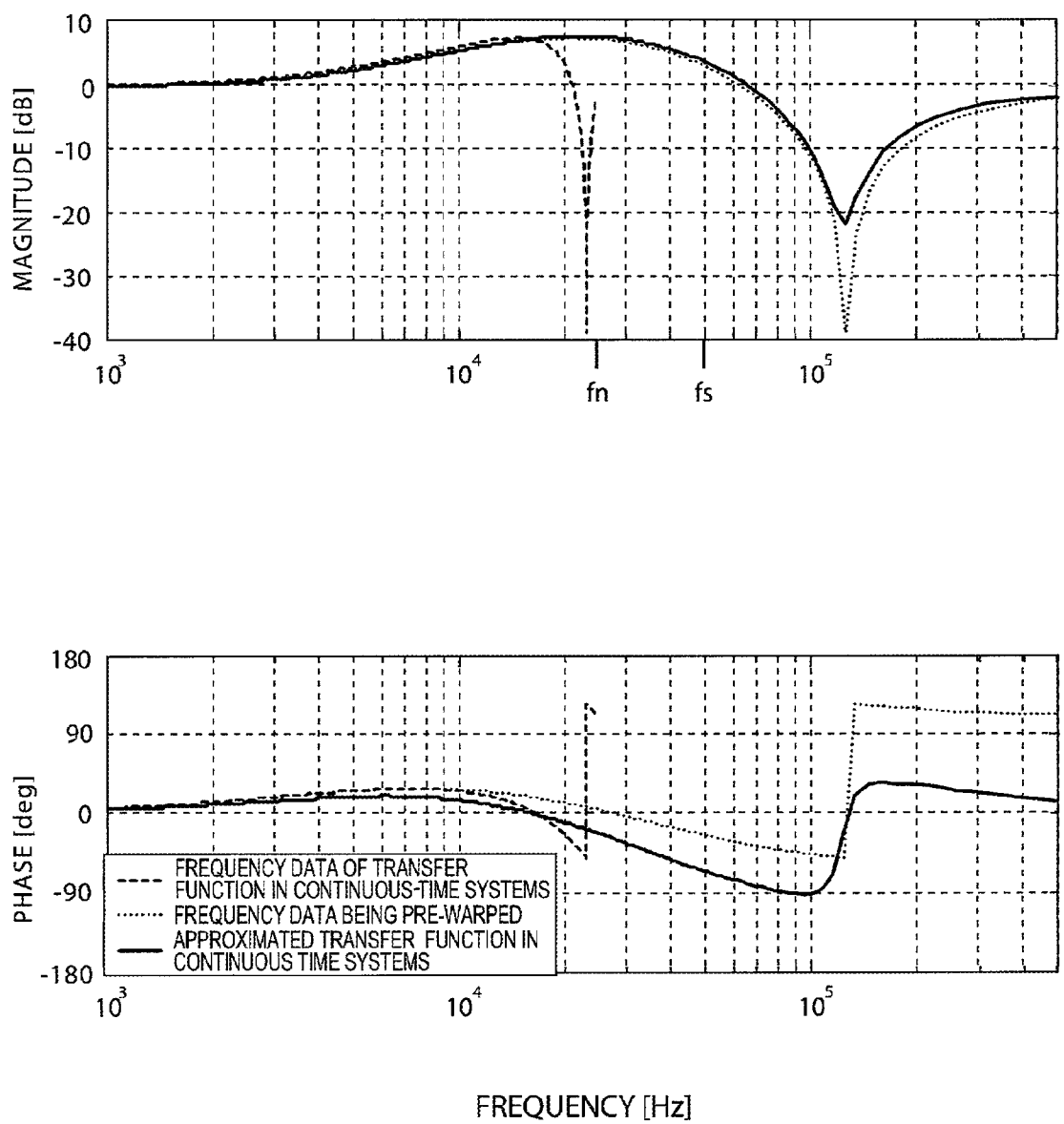
FIG. 10 shows a frequency characteristic diagram as a result of pre-warping and approximation according to the second embodiment of the present invention shown in FIG. 8.
Figure 11:
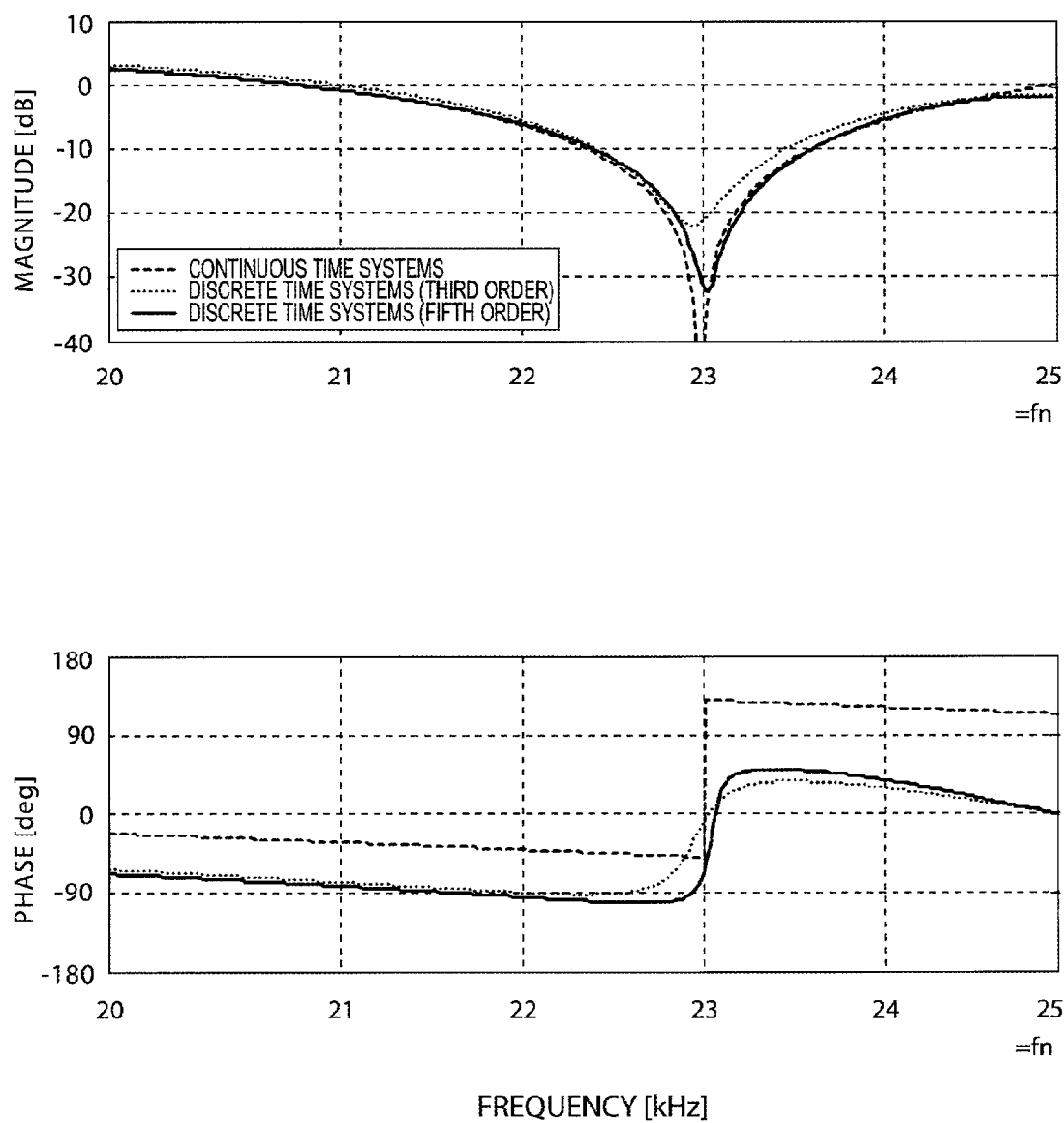
FIG. 11 shows a frequency characteristic diagram as a result of the discretization processing according to the second embodiment of the present invention shown in FIG. 8.

FIG. 8 shows a flowchart of the discretization processing according to a second embodiment of the present invention. FIG. 9 shows an explanation diagram of poles and zero points as a result of the discretization processing. FIG. 10 shows a characteristic diagram of an approximated transfer function in continuous time systems according to the second embodiment of the present invention shown in FIG. 8. Also, FIG. 11 shows a frequency characteristic diagram as a result of the discretization processing according to the second embodiment of the present invention shown in FIG. 8.

In this embodiment, the approximation on the five (5) orders is introduced at the time of approximation by the least square method in step S4, which is two orders higher than the transfer function in continuous time systems, instead of the approximation on the same order as that in the first embodiment. More specifically, while steps S11, 12, 13 and 15 are identical to steps S1, 2, 3 and 5 in FIG. 1 of the first embodiment, the least square approximation in step S14 is carried out on the order (five orders in this example) higher than the order of the transfer function in continuous time systems in step S4 (three orders in this example).

The frequency response data obtained in the approximated transfer function in continuous time systems in step S14 is shown by the solid lines shown in FIG. 10. In contrast, the frequency response characteristic of the original transfer function in continuous time systems and the frequency response characteristic of the pre-warped transfer function are shown by the broken line and the dotted line, respectively, in FIG. 10. The formula of the approximated transfer function is expressed by the following formula (8).

$$\frac{K_4 \cdot (s + W_{n41}) \cdot (s + W_{n42}) \cdot (s + W_{n43}) \cdot (s^2 + 2 \cdot Z_{n44} \cdot W_{n44} \cdot s + W_{n44}^2)}{(s + W_{d41}) \cdot (s + W_{d42}) \cdot (s + W_{d43}) \cdot (s + W_{d44}) \cdot (s + W_{d45})} \quad (8)$$

where, K4=0.8451, Wn41=3.322e6 rad/s, Wn42=4.858e5 rad/s, Wn43=3.121e4 rad/s, Wn44=8.0654e5 rad/s, Zn44=0.0226, Wd41=2.900e6 rad/s, Wd42=1.292e6 rad/s, Wd43=2.528e5 rad/s, Wd44=2.133e5 rad/s, and Wd45=1.377e5 rad/s.

Further, in FIG. 11, there is shown the discretization result obtained by discretizing this transfer function by means of the bilinear z-transform (by the solid lines). In this figure, for the purpose of comparison, the characteristics of the original transfer function in continuous time systems (broken lines) and the characteristics of the transfer function in discrete time systems calculated in the first embodiment (dotted lines) are also shown. The transfer function after the discretization is shown the following formula (9).

$$\frac{K_5 \cdot (z + W_{n51}) \cdot (z + W_{n52}) \cdot (z + W_{n53}) \cdot (z^2 + 2 \cdot Z_{n54} \cdot W_{n54} \cdot z + W_{n54}^2)}{(z + W_{d51}) \cdot (z + W_{d52}) \cdot (z + W_{d53}) \cdot (z + W_{d54}) \cdot (z + W_{d55})} \quad (9)$$

where, K5=1.346, Wn51=−0.5243, Wn52=0.6586, Wn53=0.9416, Wn54=0.9945, Zn54=0.9698, Wd51=0.1587, Wd52=0.3615, Wd53=0.4331, Wd54=0.8563, and Wd55=0.9333. Additionally, the poles and zero points after the discretion are shown in FIG. 9.

In FIG. 11, when comparing between the characteristics of the transfer function (three orders) in continuous time systems illustrated by the broken lines; the characteristics of the discretization result (three orders) according to the first embodiment of the present invention being illustrated by the dotted lines; and the characteristics of the discretization result (five orders) according to the second embodiment being illustrated by the solid lines; it is to be understood that the characteristics of the discretization result of higher order (five orders) are closer to the characteristics of the transfer function in continuous time systems. This is because the result of higher order in the approximation increases the degree of freedom in characteristic, enabling more accurate approximation. Thus, according to the second embodiment of the present invention, a transfer function designed and identified in continuous time systems can be reproduced by a transfer function in discrete time systems more accurately.

[Third Embodiment]

Figures 12, 13:
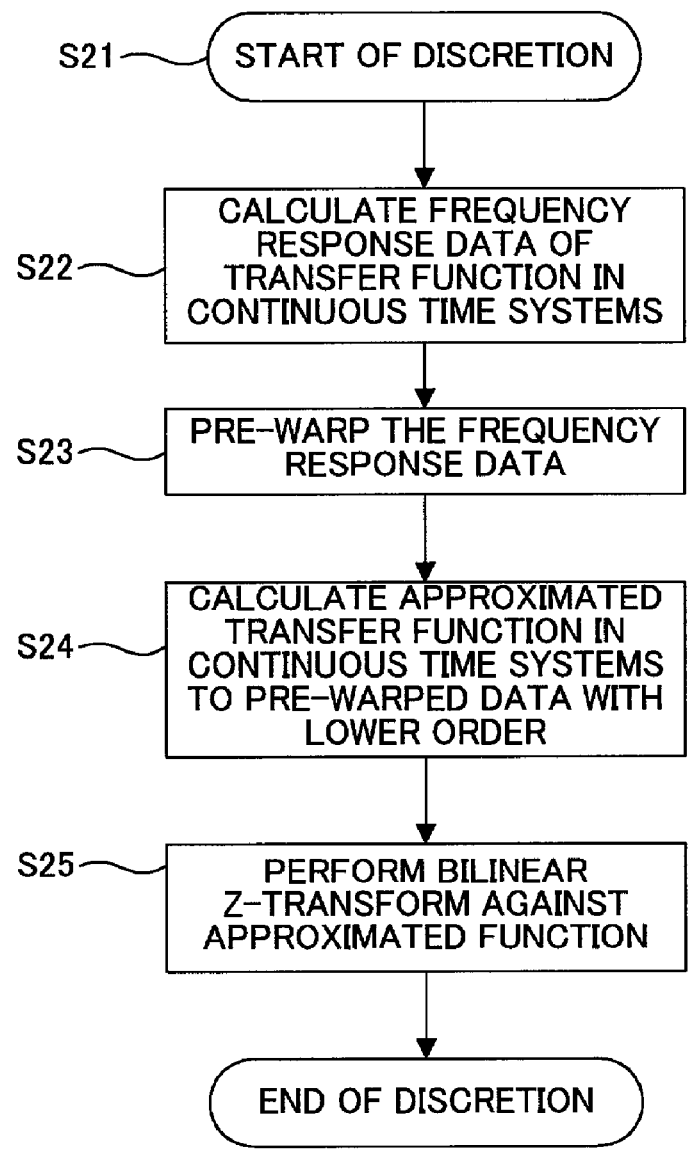
FIG. 12 shows a flowchart of the discretization processing according to a third embodiment of the present invention.
FIG. 13 shows an explanation diagram of poles and zero points as a result of the discretization processing according to the third embodiment shown in FIG. 12.
Figure 14:
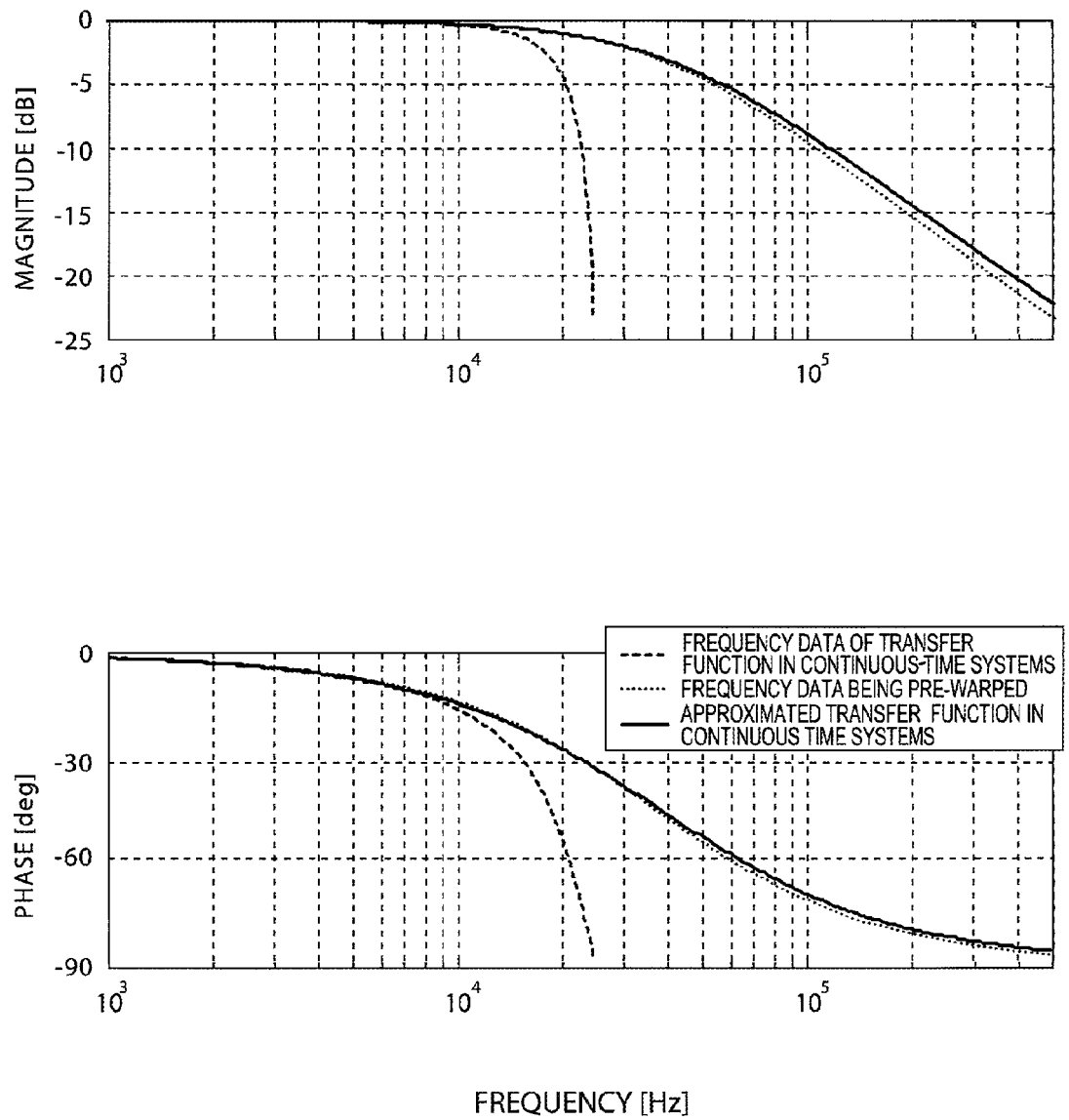
FIG. 14 shows a frequency characteristic diagram as a result of pre-warping and approximation according to the third embodiment of the present invention shown in FIG. 12.
Figure 15:
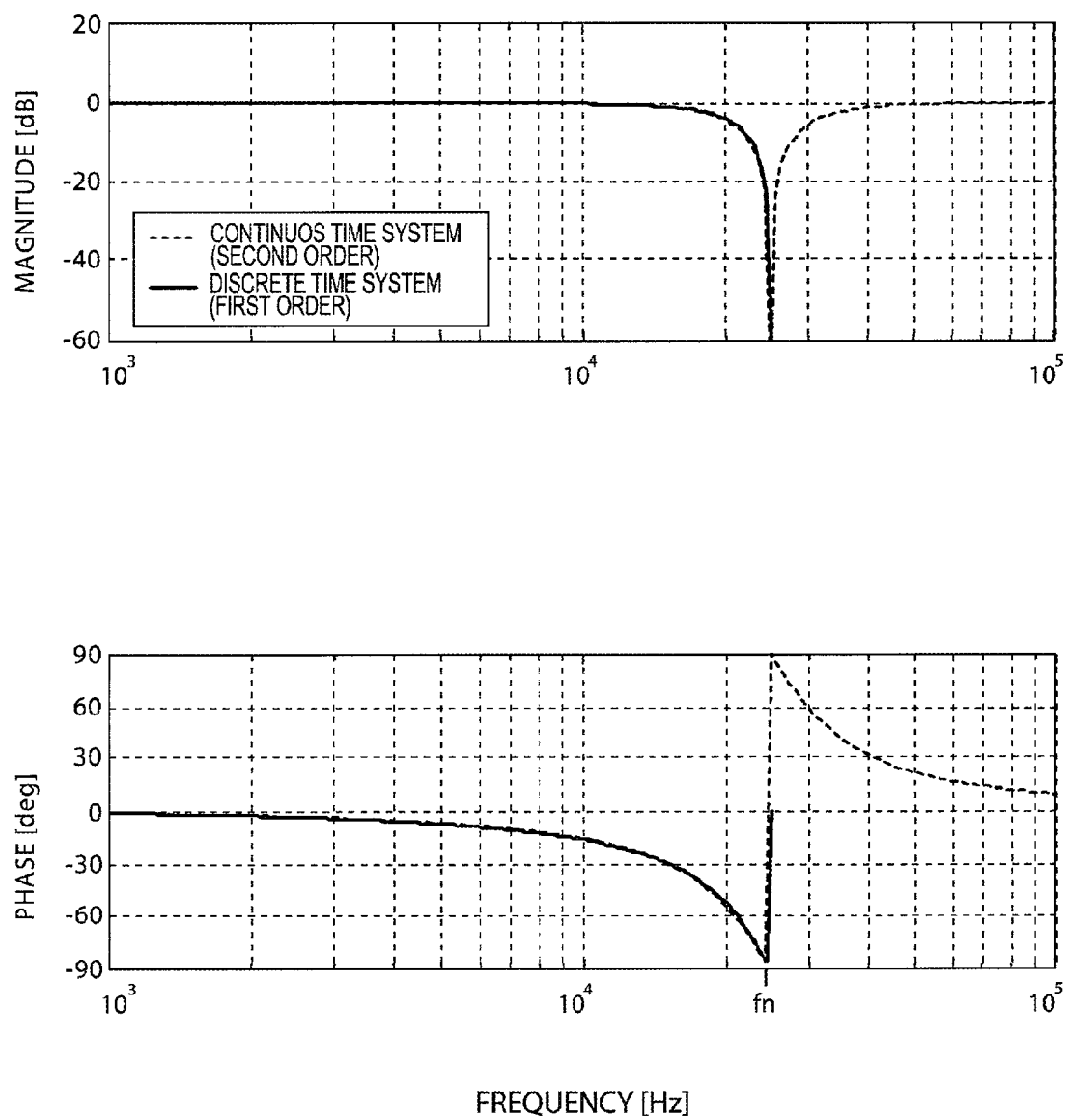
FIG. 15 shows a frequency characteristic diagram as a result of the discretization processing according to the third embodiment of the present invention shown in FIG. 12.

FIG. 12 shows a flowchart of the discretization processing according to a third embodiment of the present invention. FIG. 13 shows an explanation diagram of poles and zero points as a result of the discretization. FIG. 14 shows a frequency characteristic diagram of the approximated transfer function in continuous time systems according to the third embodiment shown in FIG. 12. Also, FIG. 15 shows a frequency characteristic diagram as a result of the discretization according to the third embodiment shown in FIG. 12.

In this third embodiment, as compared to the first embodiment, the approximation is carried out on first order, which is one order lower than in the first embodiment, when approximating by the least square method in step S4, instead of approximating on the same order as the transfer function in continuous time systems. More specifically, in FIG. 12, steps S21, 22, 23 and 25 are identical to steps S1, 2, 3 and 5 shown in FIG. 1. However, step S24 performs the least square approximation of step S4 on lower order (first order in this example) than the order of the transfer function in continuous time systems (second order in this example).

As this third embodiment, an example for discretizing a notch filter on the Nyquist frequency is shown. The frequency of the notch filter is 25 kHz and ζ=0.3. The transfer function in continuous time systems is expressed by the following formula (10).

$$\frac{K_6 \cdot (s^2 + W_{n61}^2)}{(s^2 + 2 \cdot Z_{d61} \cdot W_{d61} \cdot s + W_{d61}^2)} \quad (10)$$

where, K6=1.000, Wn61=1.571e5 rad/s, Wd61=1.571e5 rad/s, and Zd61=0.300.

The discretization method is identical to the method in the first embodiment, except for the approximation of first order, instead of the same order of the transfer function in continuous time systems. Frequency response data of the notch filter are plotted onto the broken lines shown in FIG. 14, and pre-warped frequency response data are plotted onto the dotted lines in FIG. 14. Also, the characteristics of the approximated transfer function in continuous time systems are illustrated by the solid lines shown in FIG. 14. The approximated transfer function is expressed by the following formula (11).

$$\frac{K_7 \cdot (s + W_{n7})}{(s + W_{d7})} \quad (11)$$

where, K7=5.715e−4, Wn7=4.253e8 rad/s, and Wd 7=2.431e5 rad/s.

Further, the characteristics of the discrete transfer function are illustrated by the solid lines in FIG. 15, and also the characteristics of the transfer function in continuous time systems are illustrated by the dotted lines in FIG. 15. The discrete transfer function is expressed by the following formula (12).

$$\frac{K_8 \cdot (z + W_{n8})}{(z + W_{d8})} \qquad (12)$$

where, K8=0.7086, Wn8=0.9995, and Wd8=0.4170, as shown in FIG. 13.

In FIG. 15, by comparing the transfer function (second order) in continuous time systems being illustrated by the broken lines with the discretization result (first order) according to the third embodiment being illustrated by the solid lines, it is to be understood that both characteristics are nearly identical, despite the number of orders having been decreased by one. As such, depending on the characteristic of a transfer function in continuous time systems, there is a case that the characteristic can be reproduced faithfully even if the number of orders is decreased when discretizing. With the decreased number of orders in discretization, it becomes possible to decrease the number of calculations performed by the processor to realize the transfer function in discrete time systems using digital control.

[Application to Feedback Control Systems and Compensators]

As an exemplary application of the aforementioned embodiments, hereinafter there is shown a system for discretizing a feedback compensator of continuous time systems of which the controlled object is a transfer function having a characteristic shown in FIG. 17, using the method according to the first embodiment. For example, this feedback compensator is applied to a tracking control system (feedback control system) in a disk drive unit shown in FIG. 16.

Figure 16:
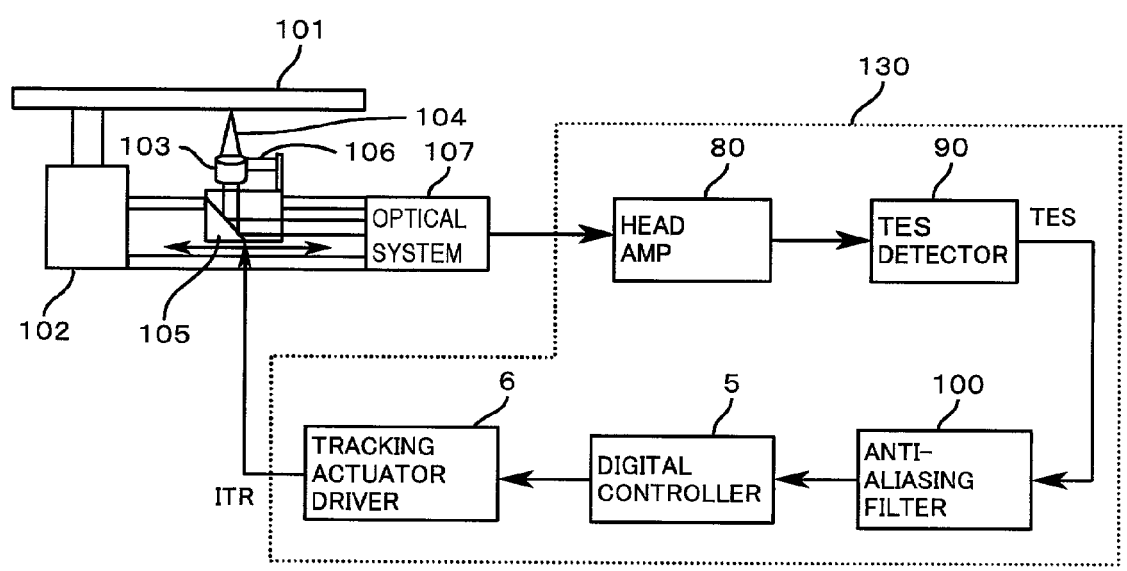
FIG. 16 shows an explanation diagram of a disk drive unit according to an application example of the present invention.
Figure 17:
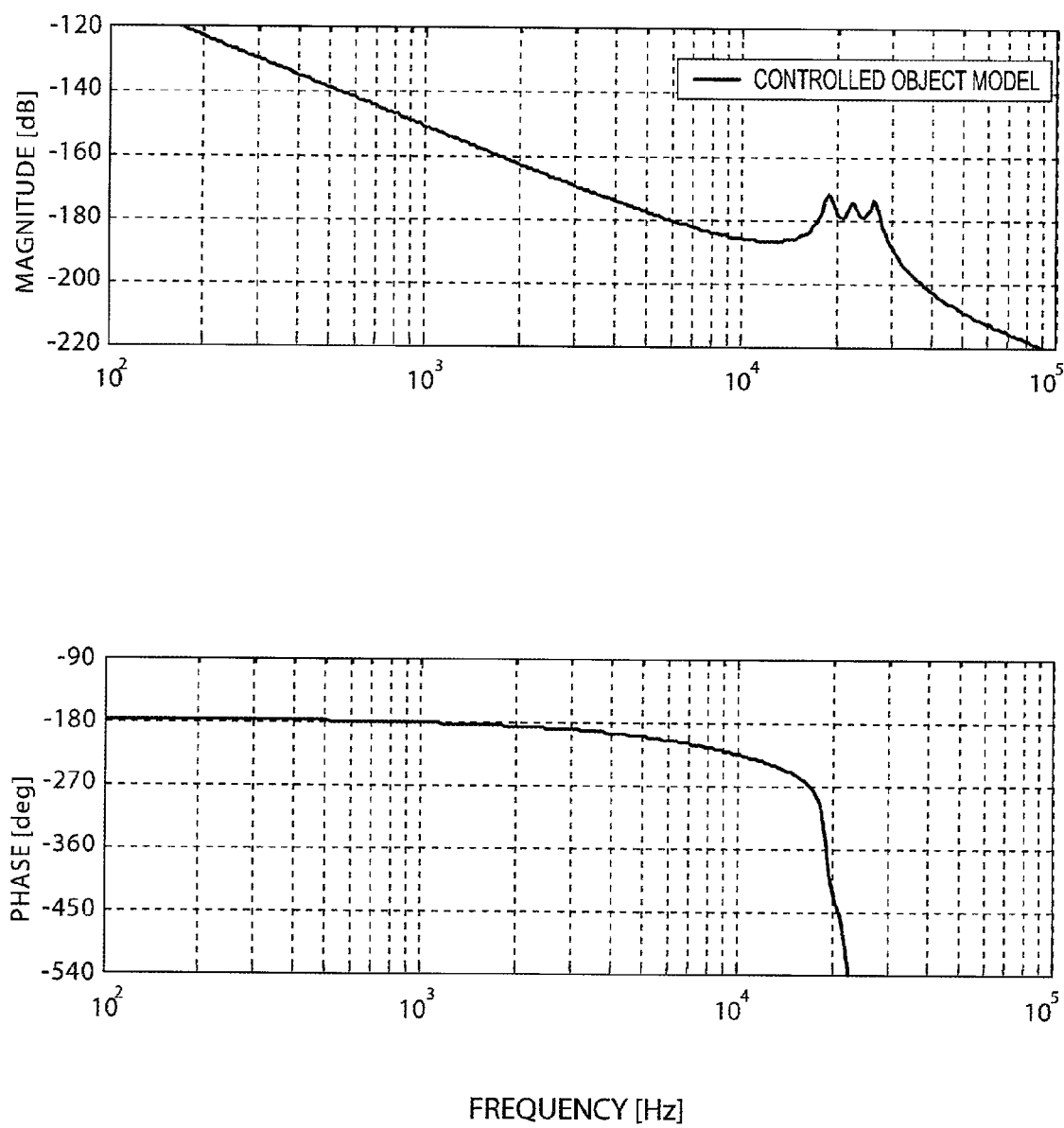
FIG. 17 shows a frequency characteristic diagram of a control model according to the application example of the present invention shown in FIG. 16.

Referring to FIG. 16, the tracking control system of this disk drive unit is explained.

FIG. 16 is a magnetic-optical disk drive unit (hereinafter simply referred to as an optical disk unit). In this figure, there are omitted parts having no direct relations with the explanation of this embodiment such as a regeneration signal processing circuit, an interface circuit to a host computer, and a focus control circuit.

As shown in FIG. 16, the optical disk unit is provided with a spindle motor 102 for rotating an optical disk 101 mounted on the optical disk unit having information tracks for recording information. In the optical disk unit, there are also provided, as configuration elements of an optical head for recording and regenerating information to/from the optical disk 101, an objective lens 103 for irradiating a light beam 104 onto the information tracks of the optical disk 101; a focus actuator 106 for driving the objective lens 103 in an optical axis direction (vertical direction in the figure; a focusing direction) as a focus movement means; a carriage (actuator) 105, on which the objective lens 103, the focus actuator 106, etc. are mounted, being structured movable in a radial direction of the above-mentioned optical disk 101; and an optical system 107 including a laser diode as a light source and a photodetector.

Further, a tracking control circuit 130 includes a head amplifier 80 for amplifying output current of the photodetector; a tracking error signal detection circuit (TES detector) 90 for detecting a tracking error signal from the photodetector. Moreover, in order to stabilize the tracking control systems, the tracking control circuit 130 includes a low-pass filter (anti-aliasing filter) 100 for eliminating high frequency components in a tracking error signal (TES); a digital servo controller (feedback compensator) 5 for generating a servo control signal from the tracking error signal (TES); and a tracking actuator driver (amplifier) 6 for supplying a driving current to a coil being provided for driving the above-mentioned carriage 105 according to the output signal from the digital servo controller 5.

Driven by a drive current ITR being supplied from the tracking actuator driver 6, this carriage 105 can move in a transversal direction (horizontal direction in the figure; a tracking direction) of information tracks on the optical disk 101 integrally with both the objective lens 103 and the focus actuator 106, so that the carriage 105 enables the light beam 104 to irradiate on the entire information tracks. For this purpose, the carriage 105 is provided with, for example, a voice coil motor.

According to this configuration of the carriage 105, for example, the focus actuator 106 is constituted by a holder for fixing the objective lens 103; a flat spring for supporting the objective lens 103 movably in the focusing direction, as well as substantially fixedly in the tracking direction; and a focus coil for driving the objective lens 103. The carriage 105 mounts the above-mentioned focus actuator 106 on the top thereof. There are provided tracking coils on both sides of carriage 105 as a carriage drive means for driving the carriage 105.

The carriage 105 having such a configuration is fabricated with a guide axis along the carriage 105 and a magnetic circuit, to configure an optical head. By making a current flow onto the focus coil, the focus actuator 106 is enabled to drive in the focusing direction. Also, by making a current flow onto the tracking coil, the carriage 105 is enabled to drive in the tracking direction. By driving the carriage 105, the light beam 104 is driven toward the tracking direction. Thus the tracking actuator is constituted.

Meanwhile, the digital servo controller (feedback compensator) 5 is constituted of an analog-to-digital converter for converting an analog tracking error signal (TES), which is an observation signal for control, to a digital value; a digital signal processor (DSP) for processing this digital signal; and a digital-to-analog converter for converting a DSP digital drive voltage to an analog drive voltage.

Now, an operation of the tracking control system having the above-mentioned configuration is described hereafter. First, the spindle motor 102 is rotated at a predetermined speed by a non-illustrated motor control circuit. Also, by means of drive control of a non-illustrated laser control circuit, a laser diode included in the optical system 107 is made to emit light at a predetermined output.

Then, the focus actuator 106 is driven by a non-illustrated focus control circuit to control the position of the objective lens 103 toward the focusing direction so that the light beam 104 focuses on the information tracks of the optical disk 101. The reflection light of the light beam 104 from the optical disk 101 is received by a photodetector in the optical system 107, and is amplified by the head amplifier 80. The amplified signal is then output to the tracking error signal detection circuit 90.

In this condition, based on the output from the above-mentioned photodetector, the tracking error signal detection circuit 90 generates a tracking error signal (TES) that indicates a degree of position deviation being irradiated by the light beam 104 from the center of an information track. Normally, the level of the tracking error signal (TES) becomes zero when the light beam 104 irradiates upon the center of an information track or substantially at the middle point of information tracks. The tracking error signal (TES) varies on a shape of sine wave according to the deviation of light beam 105

In respect of the tracking error signal output from the tracking error signal detection circuit 90, high frequency components thereof (i.e. noise components) are eliminated by the low-pass filter 100. Thereafter, servo calculation is performed on this signal by the digital servo controller 5, to negative-feedback to the carriage 105 as a drive current (ITR) by the tracking actuator driver 6. With this drive current (ITR), the carriage 105 is driven to move toward the direction to compensate the positional deviation of the light beam 104 having been detected by the tracking error signal detection circuit 90.

In such a manner, by feedbacking the tracking error signal to the tracking coil being provided for driving carriage 105, the position of the light beam 104 in tracking direction is driven so that the tracking error signal becomes to zero. Thus tracking control of the light beam 104 is carried out so that the beam position of the light beam 104 follows the center of the information track. The aforementioned explanation has been described using an optical disk unit (including magneto-optical disk unit). The description can also be applied to other disk units such as a magnetic disk unit.

Now, the discretization processing of this compensator for the feedback control system is described herein after referring to FIGS. 17, 18, 19, 20 and 21. The controlled object (carriage 105) shown in FIG. 16 is assumed to have frequency characteristics shown by the controlled object model in FIG. 17. The characteristics of the compensator in continuous time systems to be controlled are shown by the broken lines in FIG. 18. Namely, this compensator is constituted of a first-order integrator, a second-order phase lead compensator and four notch filters. The transfer function in continuous time systems is shown by the following formula (13).

$$\frac{K_9 \cdot \prod_{i=1}^{3}(s+W_{n9i}) \cdot \prod_{i=4}^{7}(s^2 + 2 \cdot Z_{n9i} \cdot W_{n9i} \cdot s + W_{n9i}^2)}{\prod_{i=1}^{3}(s+W_{d9i}) \cdot \prod_{i=4}^{7}(s^2 + 2 \cdot Z_{d9i} \cdot W_{d9i} \cdot s + W_{d9i}^2)} \quad (13)$$

In the above formula (13), as shown in the data of poles and zero points in FIG. 21A, K9=4.794e14, Wn91=2.902e4 rad/s, Wn92=5.002e3 rad/s, Wn93=3.142e3 rad/s, Wn94=1.162e5 rad/s, Zn94=0, Wn95=1.320e5 rad/s, Zn95=0, Wn96=1.728e5 rad/s, Zn96=0.03, Wn97=2.200e5 rad/s, Zn97=0, Wd91=2.595e5 rad/s, Wd92=8.706e4 rad/s, Wd93=7.103e4 rad/s, Wd94=1.162e5 rad/s, Zd94=0.3, Wd95=1.320e5 rad/s, Zd95=0.2, Wd96=1.376e5 rad/s, zd96=0.33, Wd97=2.200e5 rad/s, and Zd97=0.3.

Figure 19:
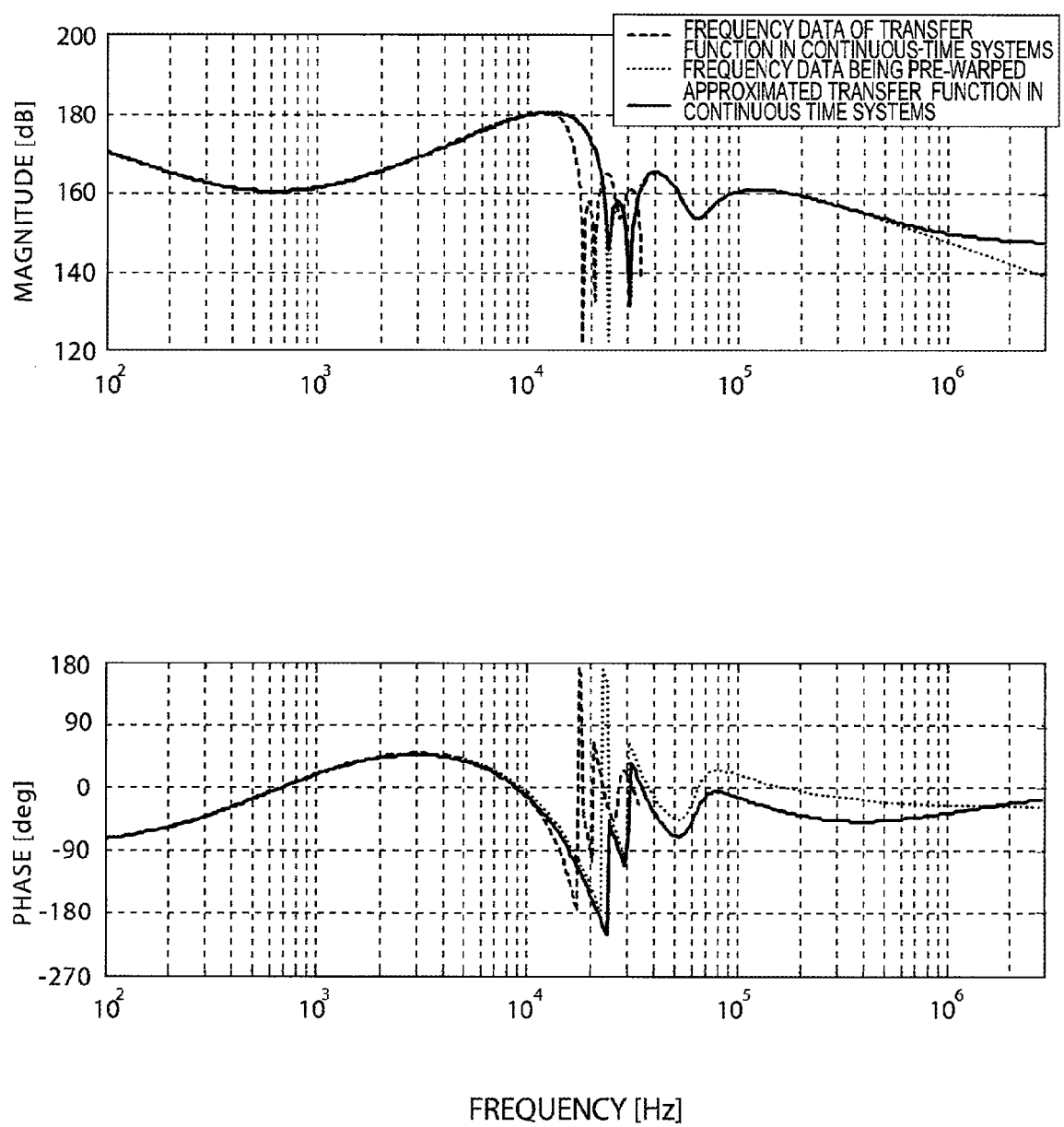
FIG. 19 shows a frequency characteristic diagram as a result of pre-warping and approximation of the transfer function in continuous time systems shown in FIG. 18.

In the discretization processing, a sampling frequency is set to 70.028 kHz, and 500 points of frequency response data are set in the range of 100 Hz to 34.84 kHz. Other conditions are set identically to those in the first embodiment. Broken lines in FIG. 19 show the frequency response data of the compensator by formula (13) after this discretion. Also, the pre-warped data are plotted by the dotted lines in FIG. 19, and the characteristics of the approximated transfer function in continuous time systems are shown by the solid lines in FIG. 19. The approximated transfer function is expressed by the following (14).

$$\frac{K_{10} \cdot \prod_{i=1}^{5}(s+W_{n10i}) \cdot \prod_{i=6}^{8}(s^2 + 2 \cdot Z_{n10i} \cdot W_{n10i} \cdot s + W_{n10i}^2)}{\prod_{i=1}^{3}(s+W_{d10i}) \cdot \prod_{i=4}^{7}(s^2 + 2 \cdot Z_{d10i} \cdot W_{d10i} \cdot s + W_{d10i}^2)} \quad (14)$$

where, as shown in the data of poles and zero points in FIG. 21B, K10=2.423e7, Wn101=5.977e6 rad/s, Wn102=1.035e6 rad/s, Wn103=3.050e4 rad/s, Wn104=4.868e3 rad/s, Wn105=3.219e3rad/s, Wn106=1.528e5rad/s, Zn106=1.070e-4, Wn107=1.925e5 rad/s, Zn107=0.0032, Wn108=3.943e5 rad/s, Zn108=0.125, Wd101=9.949e5 rad/s, Wd102=5.422e5rad/s, Wd103=2.009 rad/s, Wd104=6.387e4 rad/s, Zd104=0.9246, Wd105=1.269e5 rad/s, Zd105=0.4892, Wd106=1.630e5 rad/s, Zd106=0.3261, Wd107=2.184e5 rad/s, and Zd107=0.4183.

Figure 18:
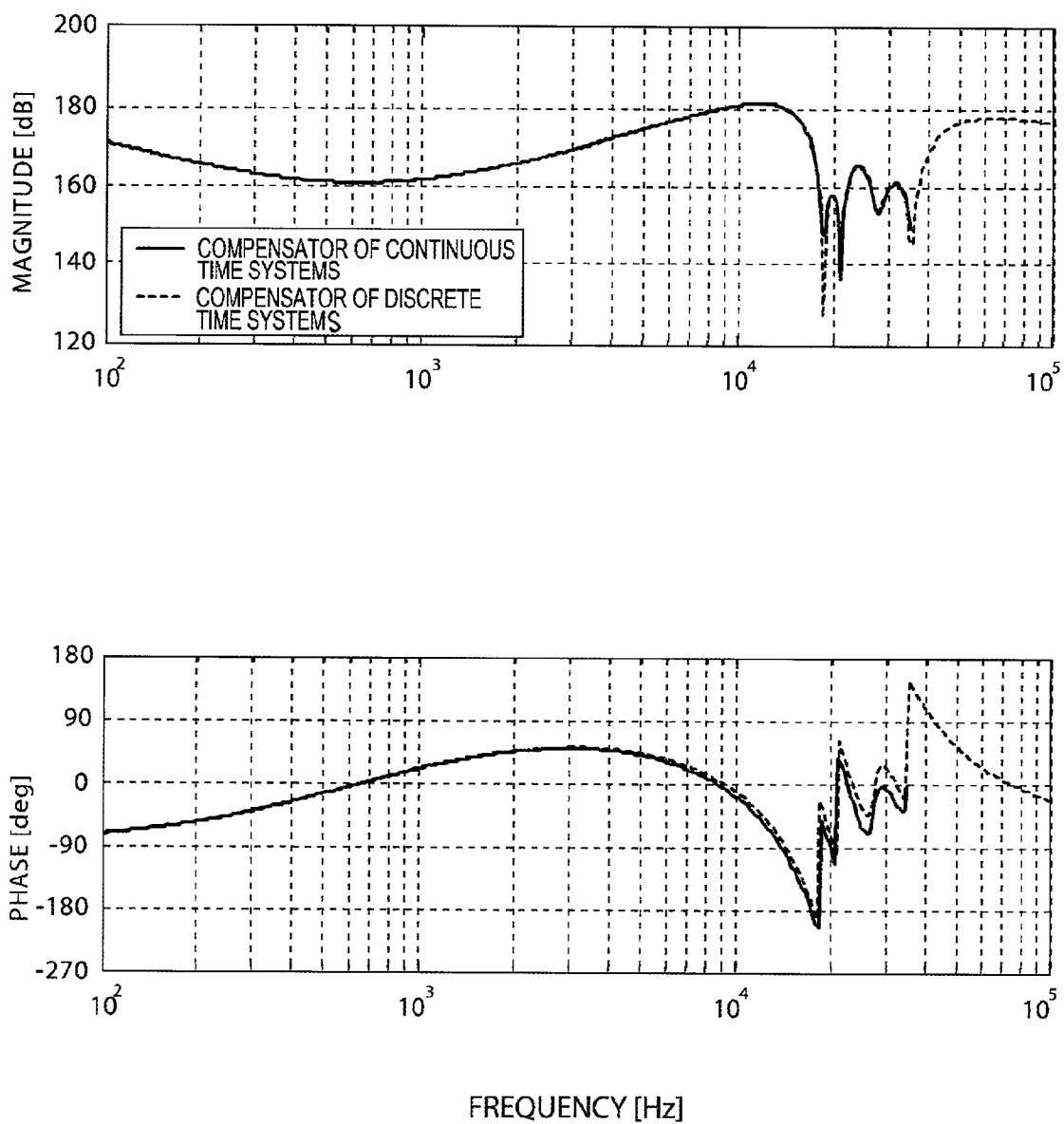
FIG. 18 shows a frequency characteristic diagram of a compensator in both continuous time systems and discrete time systems according to the application example of the present invention shown in FIG. 17.

In FIG. 18, solid lines show the discretion result of the above formula (14) by the bilinear z-transform. Also, the transfer function after discretization is expressed by the following formula (15).

$$\frac{K_{11} \cdot \prod_{i=1}^{5}(z+W_{n11i}) \cdot \prod_{i=6}^{8}(z^2 + 2 \cdot Z_{n11i} \cdot W_{n11i} \cdot z + W_{n11i}^2)}{\prod_{i=1}^{3}(z+W_{d11i}) \cdot \prod_{i=4}^{7}(z^2 + 2 \cdot Z_{d11i} \cdot W_{d11i} \cdot z + W_{d11i}^2)} \quad (15)$$

where, as shown in the data of poles and zero points in FIG. 21C, K11=2.167e8, Wn111=0.9542, Wn112=0.7616, Wn113=−0.9551, Wn114=−0.9328, Wn115=−0.6424, WW116=0.9241, Zn116=0.7786, Wn117=0.9969, Zn117=0.3077, Wn118=0.9999, Zn118=0.0872, Wd111=−1, Wd112=0.7532, Wd113=0.5894, Wd114=−0.4219, Zd114=0.9154, Wd115=−0.5875, Zd115=0.1129, Wd116=0.6701, Zd116=0.4510, Wd117=0.7158, and Zd117=0.1589.

Figure 20:
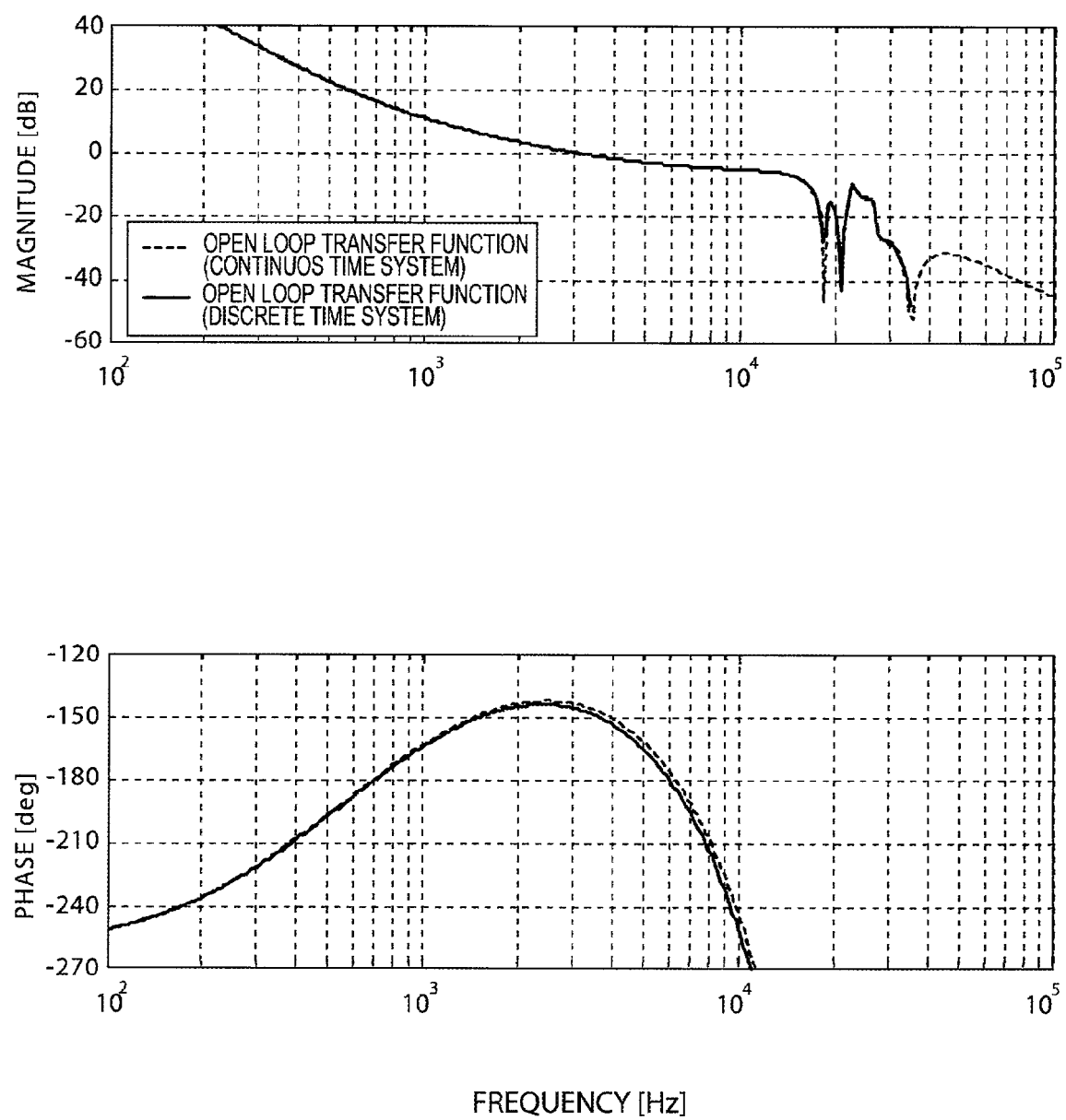
FIG. 20 shows a frequency characteristic diagram of a open loop transfer function in continuous time systems and in discrete time systems shown in FIG. 18.
Figure 22:
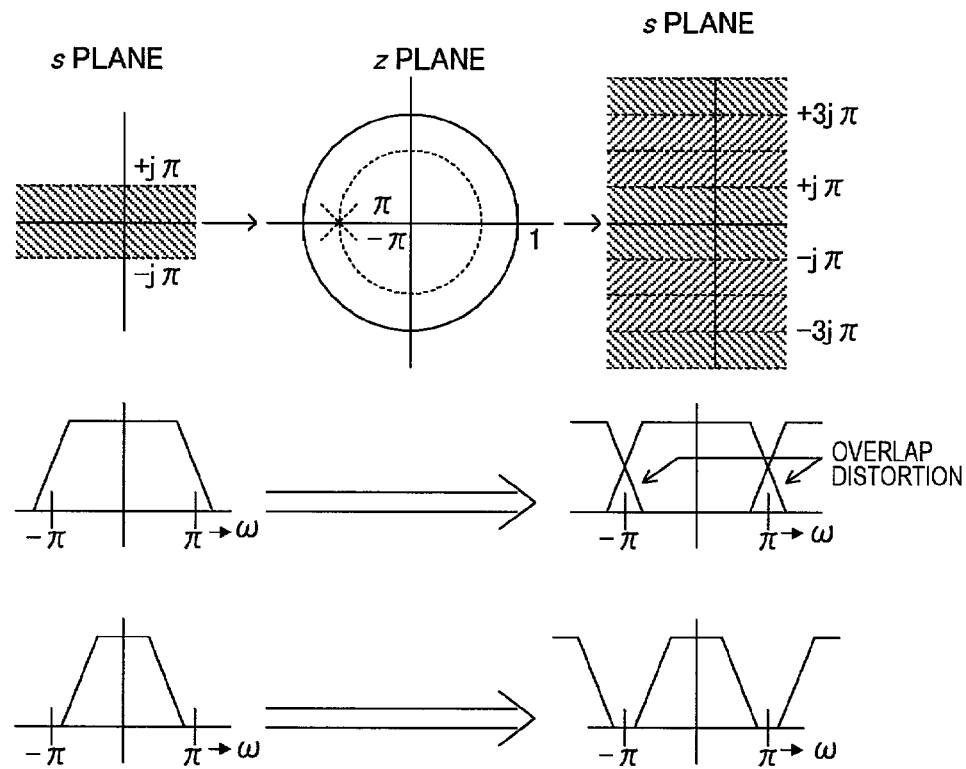
FIG. 22 shows an explanation diagram of the conventional standard s-z transform.
Figure 23:
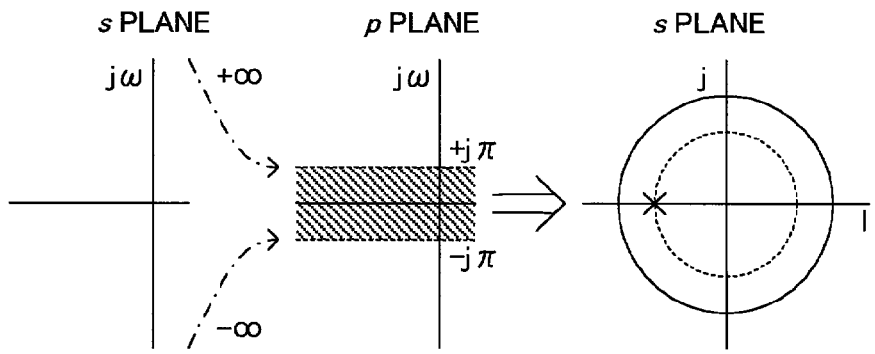
FIG. 23 shows an explanation diagram of the conventional bilinear z-transform.

In FIG. 20, there is shown a comparison of loop transfer characteristics between the case of employing the compensator in discrete time systems according to the present invention and the case of employing the compensator in continuous time systems. It is to be understood that the both characteristics are matched up to the Nyquist frequency (35 kHz in these cases).

In the conventional discretization processing method, it is not possible to precisely discretize the notch filter more than 20 kHz, which is near the Nyquist frequency. Therefore, there has been no other choice than to employ either of the following two methods: to use an analog control circuit or to realize using higher speed processor with an increased sampling frequency.

According to the present invention, it becomes possible to obtain a compensator in discrete time systems having high fidelity of characteristics in continuous time systems, which enables to construct a feedback control system at a low cost without necessitating introduction of an analog control circuit or a high speed processor.

[Other Embodiments]

The aforementioned description is based on a tracking control system as a feedback control system. However, it is also possible to apply the method of the present invention to other feedback control system such as a focus control system. Further it is also possible to apply the method of the present invention to a digital filter, etc. as a compensator.

To summarize, according to the method of the present invention, using an angular frequency transformation characteristic of the bilinear z-transform being expressed by formula (1), a new transfer function in continuous time systems is generated so as to obtain a characteristic of the discretization result being coincident with that of the original transfer function in continuous time systems. This new transfer function in continuous time systems is then transformed by means of the bilinear z-transform.

For this purpose, according to the present invention, angular frequency $\omega a$ of the original transfer function in continuous time systems is transformed to angular frequency $\omega c$ using the inverse characteristic of the bilinear z-transform, to generate a new transfer function in continuous time systems. The inverse characteristic is an inverse transformation characteristic of the transformation characteristic of the bilinear z-transform expressed by formula (1). Therefore, by performing the bilinear z-transform against the transfer function in continuous time systems having been newly obtained by the angular frequency transformation of the inverse characteristic, it is possible to obtain a discretization result having the coincident characteristic with that of the original transfer function in continuous time systems.

In such a compensator and a feedback control system performing the discretization result of which characteristics are coincident, it is not necessary to employ an analog circuit nor a high speed processor for producing high sampling frequency rate, which contributes to reduce the cost of a compensator or a feedback control system.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A compensator for compensating a transfer function in continuous time systems by discretization processing using a transfer function in discrete time systems, said compensator comprising:

a digital device for performing said transfer function in discrete time systems, said transfer function being obtained by performing the bilinear z-transform of angular frequency transformation characteristic against a new transfer function in continuous time systems, wherein said new transfer function is obtained by transforming said angular frequency of said transfer function in continuous time systems using an inverse characteristic of said angular frequency transformation characteristic in the bilinear z-transform.

2. The compensator according to claim 1 wherein said digital device calculates frequency response data of said transfer function in continuous time systems and performs said transfer function in discrete time systems obtained by calculating a new transfer function in continuous time systems being approximated to the frequency response data after frequency $\omega a$ of said frequency response data is shifted to $\omega c$ using the formula $\omega c = 2/T \cdot \tan(\omega a \cdot T/2)$.

3. The compensator according to claim 2 wherein said digital device performs said transfer function in discrete time systems obtained from new transfer function in continuous time systems being approximated to a transfer function having higher order than the number of orders of said original transfer function in continuous time systems.

4. The compensator according to claim 2 wherein said digital device performs said transfer function in discrete time systems obtained from new transfer function in continuous time systems being approximated to a transfer function having lower order than the number of orders of said original transfer function in continuous time systems.

5. The compensator according to claim 2 wherein said digital device performs said transfer function in discrete time systems obtained from new transfer function in continuous time systems being approximated to a transfer function from said shifted frequency response data by means of the least square method.

6. A discretion processing system for transforming a transfer function in continuous time systems to a transfer function in discrete time systems comprising:

an input equipment; and data processing equipment which transforms angular frequency of said transfer function in continuous time systems to an angular frequency using an inverse characteristic of a angular frequency transformation characteristic in a bilinear z-transform, to calculate a new transfer function in continuous time systems, and performing said bilinear z-transform of said angular frequency transformation characteristic against said new transfer function in continuous time systems, to obtain said transfer function in discrete time systems.

7. The discretion processing system according to claim 6 wherein said data processing equipment performs to calculate frequency response data of said transfer function in continuous time systems, to shift frequency $\omega a$ of said frequency response data to $\omega c$ using the formula $\omega c = 2/T \cdot \tan(\omega a \cdot T/2)$, and to calculate a new transfer function in continuous time systems being approximated to frequency response data after said shift.

8. The discretion processing system according to claim 7 wherein said data processing equipment performs approximation to a transfer function having higher order than the number of orders of said original transfer function in continuous time systems.

9. The discretion processing system according to claim 7 wherein said data processing equipment performs approximation to a transfer function having lower order than the number of orders of said original transfer function in continuous time systems.

10. A program for performing discretization processing of transforming a transfer function in continuous time systems to a transfer function in discrete time systems stored:

a program which transforms angular frequency of said transfer function in continuous time systems to an angular frequency using an inverse characteristic of the angular frequency transformation characteristic in a bilinear z-transform, to calculate a new transfer function in continuous time systems; and a program which performs said bilinear z-transform of said angular frequency transformation characteristic against said new transfer function in continuous time systems.

11. A feedback control system for observing status of a controlled object and controlling said controlled object comprising:

a status detection unit which observes said status of said controlled object; and a digital equipment which controls said controlled object according to said status signal from said status detection unit, using a transfer function in discrete time systems obtained by performing the bilinear z-transform of angular frequency transformation characteristic against a new transfer function in continuous time systems, wherein said new transfer function is obtained by transforming said angular frequency of said transfer function in continuous time systems to an angular frequency, being provided for compensating characteristic of said controlled object, using an inverse characteristic of said angular frequency transformation characteristic in said bilinear z-transformation.

12. The feedback control system according to claim 11 wherein said digital equipment performs said transfer function in discrete time systems obtained by calculating frequency response data of said transfer function in continuous time systems and by calculating new said transfer function in continuous time systems being approximated to said frequency response data after frequency ωa of said frequency response data is shifted to ωc using the formula ωc=2/T ·tan(ωa·T/2).

13. The feedback control system according to claim 12 wherein said digital equipment performs said transfer function in discrete time systems obtained from new transfer function in continuous time systems being approximated to a transfer function having higher order than the number of orders of said original transfer function in continuous time systems.

14. The feedback control system according to claim 12 wherein said digital equipment performs said transfer function in discrete time systems obtained from new transfer function in continuous time systems being approximated to a transfer function having lower order than the number of orders of said original transfer function in continuous time systems.

15. The feedback control system according to claim 11 wherein said digital equipment performs said transfer function in discrete time systems obtained from new transfer function in continuous time systems being approximated to a transfer function from said shifted frequency response data by means of the least square method.

* * * * *